United States Patent [19]
Townshend

[11] Patent Number: 5,970,103
[45] Date of Patent: Oct. 19, 1999

[54] HIGH SPEED COMMUNICATIONS SYSTEM FOR ANALOG SUBSCRIBER CONNECTIONS

[76] Inventor: Brent Townshend, 156 University Dr., Menlo Park, Calif. 94025

[21] Appl. No.: 09/152,549

[22] Filed: Sep. 14, 1998

Related U.S. Application Data

[63] Continuation of application No. 08/709,357, Sep. 6, 1996, Pat. No. 5,835,538.

[51] Int. Cl.[6] .............................. H04L 27/06; H04L 5/16
[52] U.S. Cl. ........................................... 375/340; 375/222
[58] Field of Search ..................... 375/340, 222, 375/354, 316, 358; 379/93.01, 93.05, 93.06

[56] References Cited

U.S. PATENT DOCUMENTS

| | | | |
|---|---|---|---|
| 4,736,402 | 4/1988 | Landis | 379/16 |
| 4,884,269 | 11/1989 | Duncanson et al. | 370/251 |
| 4,890,303 | 12/1989 | Bader | 375/356 |
| 4,924,492 | 5/1990 | Giltlin et al. | 379/93.08 |
| 4,955,037 | 9/1990 | Anderson et al. | 375/244 |
| 5,034,948 | 7/1991 | Mizutani et al. | 370/221 |
| 5,052,024 | 9/1991 | Moran, III et al. | 375/222 |
| 5,394,437 | 2/1995 | Ayanoglu et al. | 375/222 |
| 5,400,322 | 3/1995 | Hunt et al. | 370/346 |
| 5,406,393 | 4/1995 | Dagdeviren | 375/222 |
| 5,724,393 | 3/1998 | Dagdeviren | 375/222 |
| 5,729,226 | 3/1998 | Betts et al. | 370/522 |
| 5,754,594 | 5/1998 | Betts et al. | 375/285 |
| 5,757,849 | 5/1998 | Gelblum et al. | 375/222 |
| 5,761,247 | 6/1998 | Betts et al. | 375/316 |
| 5,784,405 | 7/1998 | Betts et al. | 375/222 |
| 5,793,809 | 8/1998 | Hoolmquist | 375/242 |
| 5,801,695 | 9/1998 | Townshend | 375/242 |
| 5,809,075 | 9/1998 | Townshend | 375/222 |
| 5,812,075 | 9/1998 | Betts et al. | 379/93 |
| 5,835,538 | 11/1998 | Townshend | 375/242 |
| 5,859,872 | 1/1999 | Townshend | 375/242 |

*Primary Examiner*—Tesfaldet Bocure
*Attorney, Agent, or Firm*—McDonnell Boehnen Hulbert & Berghoff

[57] ABSTRACT

A high speed decoder for recovering a digital data stream from an analog signal transmitted to said decoder via an analog local loop connected to said decoder. The decoder includes an interface to said local loop. The interface produces an input signal in response to the analog signal. An inverse filter is coupled to the interface. The inverse filter provides a compensated signal in response to the input signal. A converter is coupled to the inverse filter. The converter operates to convert the compensated signal into a sequence of codewords, in which each codeword in the sequence of codewords is associated with a codeword utilized by a digital telephone network. In addition, a decoding method for high speed data transfer over a connection that includes an analog subscriber loop. In a processing environment that includes a processor coupled to at least one memory structure by a bus, the decoding method includes receiving a signal from the analog subscriber loop. The received signal is filtered to invert a transformation performed in the connection, thereby providing a compensated signal. The compensated signal is converted into a data stream. The conversion utilizes a set of codewords in which each codeword in said set of codewords is associated with a codeword utilized by a digital telephone network.

6 Claims, 11 Drawing Sheets

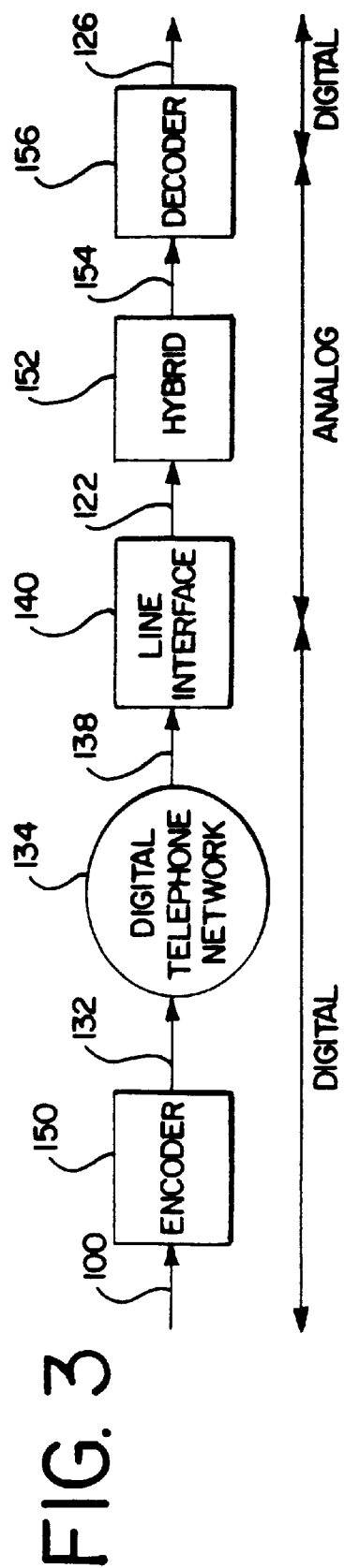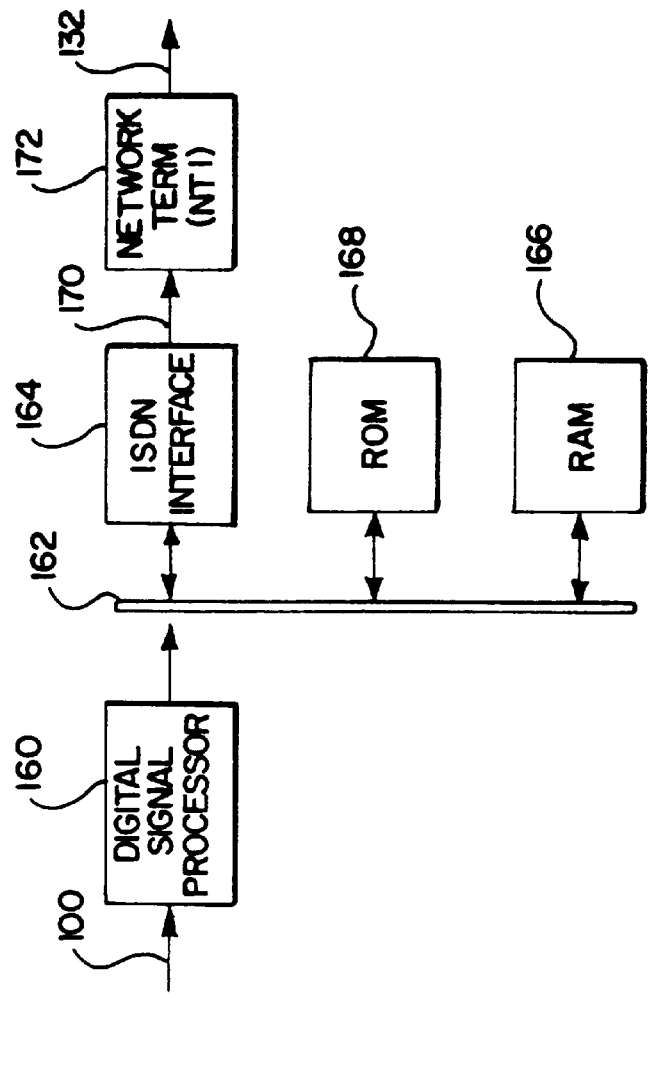
FIG. 3
FIG. 4

HIGH SPEED COMMUNICATIONS SYSTEM FOR ANALOG SUBSCRIBER CONNECTIONS

CROSS REFERENCE TO RELATED APPLICATION

This is a continuation of application Ser. No. 07/709,357 filed on Sep. 6, 1996, now issued as U.S. Pat. No. 5,835,538 on Nov. 10, 1998.

BACKGROUND OF THE INVENTION

The field of the present invention pertains generally to data communications equipment, and more particularly to a device for transmitting digital data over a telephone connection.

Data communication plays an important role in many aspects of today's society. Banking transactions, facsimiles, computer networks, remote database access, credits-card validation, and a plethora of other applications all rely on the ability to quickly move digital information from one point to another. The speed of this transmission directly impacts the quality of these services and, in many cases, applications are infeasible without a certain critical underlying capacity.

At the lowest levels, most of this digital data traffic is carried over the telephone system. Computers, facsimile machines, and other devices frequently communicate with each other via regular telephone connections or dedicated lines which share many of the same characteristics. In either case the data must first be converted into a form compatible with a telephone system designed primarily for voice transmission. At the receiving end the telephone signal must be converted back into a data stream. Both tasks are usually accomplished by modems.

A modem performs two tasks corresponding to the needs above: modulation, which converts a data stream into an audio signal that can be carried by the telephone system, and demodulation, which takes the audio signal and reconstructs the data stream. A pair of modems, one at each end of a connection, allows bidirectional communication between the two points. The constraints on the audio signal create the limitations on the speed at which data can be transferred using modems. These constraints include a limited bandwidth and degradation of data by noise and crosstalk. The telephone system typically can carry only signals that range in frequency between 300 Hz and 3,400 Hz. Signals outside this range are sharply attenuated. This range was built into the design of the telephone system since it covers a significant portion of by the human voice spectrum. However, the bandwidth of a channel is one factor that determines the maximum attainable data rate. With all other factors constant, the data rate is directly proportional to the bandwidth.

Another factor is the distortion of the audio signal or any other signal that the communications endpoints cannot control. This includes electrical pickup of other signals being carried by the telephone system (crosstalk), electrical noise, and noise introduced by conversion of the signal from one form to another. The last type will be expanded upon in later discussion.

For general utility, modems are designed to be operable over most telephone connections. Thus, they must be designed for worst-case scenarios, which include bandwidth limitations and significant noise that cannot be removed. Even so, substantial progress has been made on modem design in the past several years. Devices capable of operating at speeds up to 28,800 bits per second are now commonly available. See International Telecommunication Union, Telecommunication Standardization Sector (ITU-T), Recommendation V.34, Geneva, Switzerland (1994) which is hereby incorporated herein by reference. However, theoretical arguments based on the channel bandwidth and noise levels show that the maximum possible speed has nearly been obtained and further significant increases are highly unlikely with the given constraints. This is discussed in C. E. Shannon, "A Mathematical Theory of Communication," Bell System Technical Journal, 27:379–423, 623–656 (1948) which is hereby incorporated herein by reference.

Unfortunately, although speeds approaching 30,000 bits per second (or 3,600 bytes per second) make many data communications applications feasible, conventional modem transmission is still not fast enough for all uses. At these speeds, transmission of text is fast, and low-quality audio, such as digitized speech, is acceptable. However, facsimile or still-image transmission is slow, while high-quality audio is limited and fulll-motion video has not been satisfactorily achieved. In short, what is needed is greater data transmission capability. This is a prerequisite for the new applications and is a necessity for maximizing the performance of many existing applications.

Of course the telephone companies, cable-television providers, and others are not ignorant of these increasing data transmission needs. One approach to providing higher speed data connections to businesses and residences is to provide end-to-end digital connectivity, eliminating the need for additional modems. One offering of such a service is the Integrated Services Digital Network (ISDN). See: International Telecommunication Union, Telecommunication Standardization Sector (ITU-T), "*Integrated Services Digital Networks (ISDNs),*" Recommendation I.120, Geneva, Switzerland (1993), and John Landwehr, "*The Golden Splice: Beginning a Global Digital Phone Network,*" Northwestern University (1992) each of which is incorporated herein by reference. ISDN replaces the existing analog local loop with a 160,000 bit/second digital connection. Since the bulk of long-distance and inter-office traffic is already carried digitally, this digital local loop can be used for end-to-end digital voice, computer data or any other type of information transfer. However, to achieve these data transmission rates on the local loop, special equipment must be installed at both ends of the line. Indeed, the entire telephone network is currently undergoing a transformation from a voice transmission network to a general data transmission service, with voice just being one particular form of data.

Once installed, each basic ISDN link will offer two data channels capable of 64,000 bits/second, a control channel with a capacity of 16,000 bits/second, reduced call connection time, and other benefits. At these rates, facsimile and still image transmission will be nearly instantaneous, high-quality audio will be feasible, and remote computer connections will benefit from a fivefold speed increase. Some progress toward full-motion video may also be achieved.

The down side of ISDN is its availability, or lack thereof. To use ISDN, the users central office must be upgraded to provide this service, the user must replace its on-premises equipment (such as telephones) with their digital equivalents, and each individual line interface at the central office must be modified to carry the digital data stream. This last step, the conversion to a digital link of the millions of analog connections between every telephone and the central office, is formidable. The magnitude of this task dictates that the deployment of ISDN will be slow and coverage will be sporadic for some time to come. Rural and sparsely populated areas may never enjoy these services.

Another existing infrastructure potentially capable of providing high-speed data communications services is the cable television system. Unlike the telephone system, which connects to users via low-bandwidth, twisted-pair wiring, the cable system provides high-bandwidth connectivity to a large fraction of residences. Unused capacities on this wiring could provide data rates of tens, or even hundreds, of millions of bit per second. This would be more than adequate for all of the services envisioned above including full-motion digital video. However, the cable system suffers from a severe problem—its network architecture. The telephone system provides point-to-point connectivity. That is, each user has full use of the entire capacity of that user's connection—it is not shared with others and does not directly suffer due to usage by others. The cable system on the other hand, provides broadcast connections. The entire capacity is shared by all users since the same signals appear at each users connection. Thus, although the total capacity is high, it is divided by the number of users requiring service. This architecture works well when all users require the same data, such as for cable's original design goal, television distribution, but it does not serve well a community of users with different data needs. In a metropolitan area the data capacity available to each user may be significantly less than via an ISDN or modem connection.

To provide high-speed, data connectivity to a large number of users, the cable system could be modified to isolate different segments of the user population effectively sharing the cable bandwidth over smaller populations. However, like ISDN, this will be a slow, costly process that will provide only partial service for many years to come.

The methods used to design modems are based largely on models of the telephone system that have remained unchanged for several decades. That is, a modem is modeled as an analog channel with a finite bandwidth (400–3400 Hz) and an additive noise component on the order of 30 dB below the signal level. However, a large portion of the telephone system now uses digital transfer of a sampled representation of the analog waveforms for inter-office communications. At each central office, the analog signal is converted to a 64,000 bit/second pulse code modulated (PCM) signal. The receiving office then reconstructs the analog signal before placing it on the subscriber's line. Although the noise introduced by this procedure is, to a first approximation, similar to that observed on an analog system, the source of the noise is quite different. See K. Pahlavan and J. L. Holsinger, "*A Model for the Effects of PCM Compandors on the Performance of High Speed Modems,*" Globecom '85, pages 758–762, (1985), which is incorporated herein by reference. Most of the observed noise on a telephone connection that uses digital switching is due to quantization by the analog-to-digital converters needed to convert the analog waveform into a digital representation.

As noted above, most telephone connections are currently carried digitally between central offices at rates of 64,000 bits/second. Furthermore, ISDN services demonstrate that it is possible to transmit significantly more than these rates over the local loop. It has been suggested that it may be possible to design a transmission scheme that takes advantage of these factors. Kalet et al. postulate a system, shown in FIG. 2, in which the transmitting end selects precise analog levels and timing such that the analog-to-digital conversion that occurs in the transmitter's central office might be achieved with no quantization error. I. Kalet, J. E. Mazo, and B. R. Saltzberg, "*The Capacity of PCM Voice-band Channels,*" IEEE International Conference on Communications '93, pages 507–511, Geneva, Switzerland (1993), which is incorporated herein by reference. By making use of the mathematical results of J. E. Mazo it is conjectured that it should be theoretically possible to reconstruct the digital samples using only the analog levels available at the receiver's end of the second local loop in the communications path. J. E. Mazo, "*Faster-Than-Nyquist Signaling,*" Bell System Technical Journal, 54:1451–1462 (1975), incorporated herein by reference. The resulting system might then be able to attain data rates of 56,000 to 64,000 bits/second. The shortcoming of this method is that it is nothing more than a theoretical possibility that may or may not be realizable. Kalet et al. state that "This is a hard practical problem and we can only conjecture if a reasonable solution would be possible." Id. at page 510.

An example of a conventional attempt to solve the foregoing problem is found in work by Ohta, described in U.S. Pat. Nos. 5,265,125 and 5,166,955, which are hereby incorporated by reference. Ohta disclosed an apparatus to reconstruct a PCM signal transmitted through a communications channel or reproduced from a recording medium. These patents exemplify some conventional techniques abundant in the literature to deal with the general problem of reconstructing a multi-valued signal that has passed through a distorting channel. See also, for example, Richard D. Gitlin, Jeremiah F. Hayes and Stephen B. Weinstein, "*Data Communications Principles,*" Plenum (1992), incorporated herein by reference. However, such conventional teachings do not consider the application of methods to handle the output from a nonlinear quantizer, nor do they deal with the specific problems of decoding digital data passed over a telephone local loop. Furthermore, the problem of reconstructing a sampling rate clock from the PCM data is non-trivial when the PCM signal can take on more than two values. For example, in the patents by Ohta, a simple clock recovery scheme which relies on a binary input signal is employed. This type of clock recovery cannot be used with the multivalued codes used in a telephone system. Also, compensation for drift with time and changing line conditions requires use of an adaptive system which the prior art of PCM reconstruction does not include.

Thus, there is currently a critical disparity between the required or desired data communications capacity and that which is available. Existing modems do not provide adequate capacities, and new digital connectivity solutions are several years away from general availability. Refitting the existing infrastructure with ISDN capability is a sizable task and may take a decade before its use is widespread. A new method of data transmission could immensely benefit many current applications as well as making several new services available which would otherwise have to wait until the infrastructure catches up with the requirements.

Accordingly, there is a need for providing a new system of data transfer which provides the capability to receive data at high rates over existing telephone lines.

There is also a need for an improved system of data transfer which can enable systems, equipment, and applications designed for a digital telephone system (such as ISDN) to be used with analog connections.

There is also a need for an improved system of data transfer which is capable of taking advantage of the digital infrastructure of the telephone system without requiring costly replacement of all subscribers' lines.

It also would be desirable to create a high speed communication system to provide a means to distribute high-quality digital audio, music, video, or other material to consumers. Such an improved system of data transfer would advantageously provide a means to distribute, on-demand, individually-tailored information, data, or other digital material to a large number of consumers.

There is also a need for an improved high speed communications system to provide greater throughput for commercial applications such as facsimile, point-of-sale systems, remote inventory management, credit-card validation, wide-area computer networking, or the like.

SUMMARY OF THE INVENTION

One aspect of the present invention comprises a system for transferring data over existing telephone connections at rates higher than known modems or conventional methods of data transmission. The present invention achieves a significant improvement over conventional methods by making use of two critical observations:
1. The underlying phone system is digital using PCM transmission.
2. High data rates are required in one direction only, the source of which has direct digital access to the telephone system.

An aspect of the present invention utilizes the foregoing observations to achieve higher data transmission rates than were previously attainable with conventional systems. The second observation above addresses the largest use of modems—to access and retrieve information from centralized servers. In addition, the present invention has been found particularly useful for applications that require higher data rates, such as database access and video or audio on demand. Such applications can be realized, utilizing the high data transmission rates that are attainable through the present invention.

An important aspect of the invention is both simple and extremely powerful; that is, to allow the data provider to connect directly to a digital telephone network while the consumer uses its existing analog connections without change to the line. This configuration greatly changes the model under which the consumer's data equipment must operate. Existing modems must deal with bandwidth limitations and multiple unidentified noise sources that corrupt a signal over the entire transmission path. In contrast, an aspect of the present invention carries data digitally over the bulk of the path, from the central office to the consumer's home or office, and converts it to analog form only for the last segment of that path. Advantageously, one of the primal sources of noise to existing modems, quantization noise during analog-to-digital conversion, is completely eliminated, since such conversion is no longer required. Furthermore, quantization noise during digital-to-analog conversion, can be modeled as a deterministic phenomenon, and thus significantly reduced.

By using the foregoing aspect of the invention, the data source, which has direct access to the digital network (for example, by ISDN), can transfer exact data to the central office serving the consumer of the data. All that is then required is a device at the consumer's end of the local loop that will compensate for distortion of the data signal due to the filtering performed at the central office's digital-to-analog converters and due to the transmission line. Both distortions can be dealt with adequately using existing digital signal processing hardware, as will be described herein.

Note that although this method cannot be used for return data from the consumer to the server, existing modems can be used, giving an asymmetrical channel with a capacity of up to 64,000 bits/second from server to consumer and 20,000 to 30,000 bits/second return.

It will be appreciated that an aspect of the invention enables digital data of any type (audio, video, information, or the like) to be sent to individual users at speeds higher than can be obtained with conventional modems, or conventional methods of data transfer. Furthermore, unlike cable television distribution systems, this invention can service, at the full data rate, any number of users simultaneously requesting different data.

Beyond providing greater speed of operation for existing applications, such as remote computer access, high-speed facsimile tranmission, etc., certain aspects of the invention make several new applications possible. These include high-quality audio or music transmission, video-on-demand, still picture transmission, videophone, teleconferencing, or like applications in which high data transmission rates are essential.

Another aspect of the present invention is to reconstruct a multivalued PCM data signal from an analog representation of that signal. This is achieved using a new method which combines a novel clock synchronization technique with adaptive equalization.

In addition to the foregoing, other aspects and advantages of the present invention include: (1) the ability to effectively reconstruct the telephone system's digital pulse-code-modulated (PCM) data stream using only the analog signal at the subscriber end of the telephone line; (2) the ability to reconstruct the clock frequency and phase of the PCM data, using only the analog signal at the subscriber end of the telephone line; (3) the ability to increase the effective data rate between a central office and the subscriber end without adding additional equipment at the central office or otherwise modifying the telephone system; and (4) the ability to reconstruct said digital data after such data has been modified due to one or more of conversion to analog form, filtering, distortion, or corruption by the addition of noise.

BRIEF DESCRIPTION OF DRAWINGS

These and other features, aspects and advantages of the present invention will become better understood with regard to the following descriptions, appended claims and accompanying drawings in which:

FIG. 3 is a block diagram showing a high speed distribution system in accordance with an aspect of the present invention;

FIG. 4 is a block diagram of a hardware implementation of an encoder 150 of FIG. 3, in accordance with an aspect of the present invention;

Figure 8:
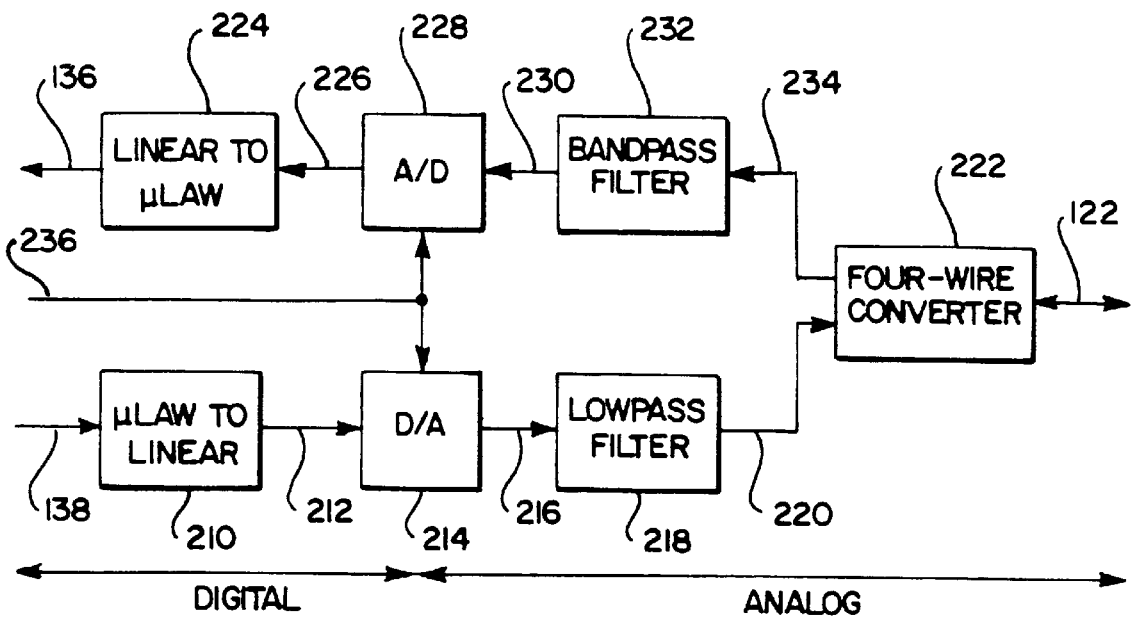
Figure 9:
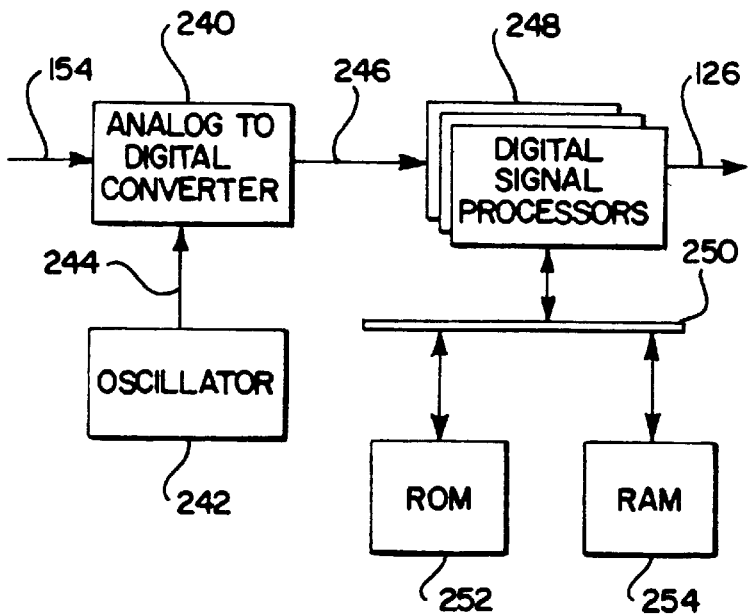
Figure 10:
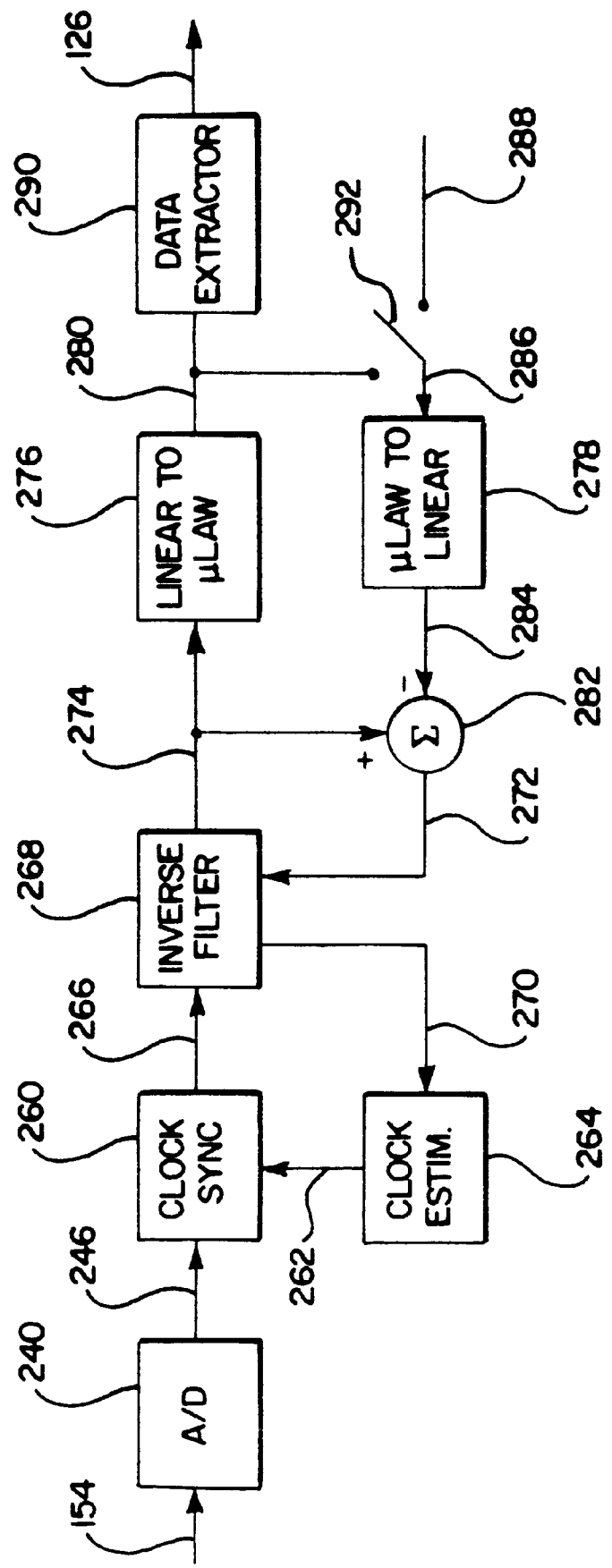
Figure 11A:
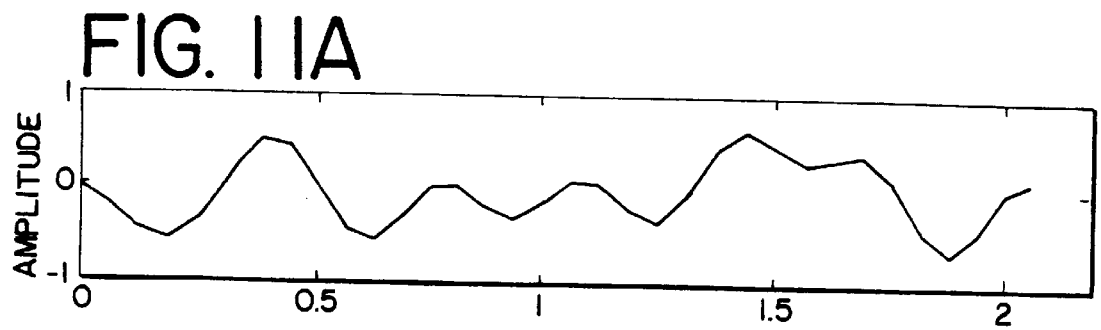
Figure 11B:
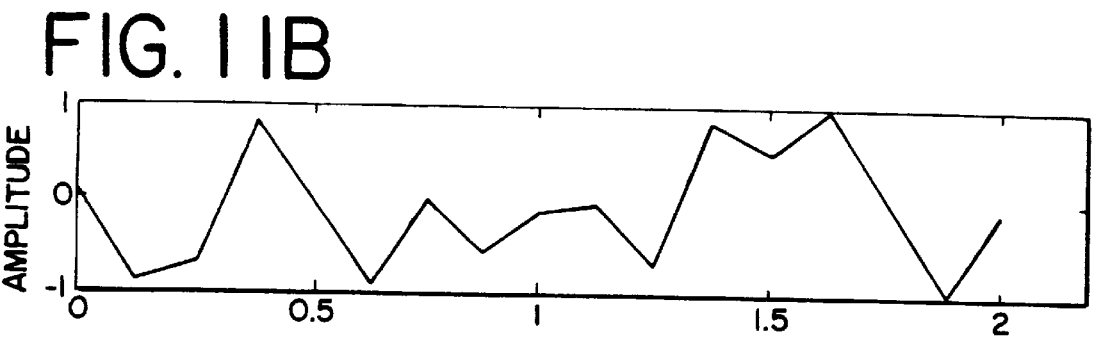
Figure 11C:
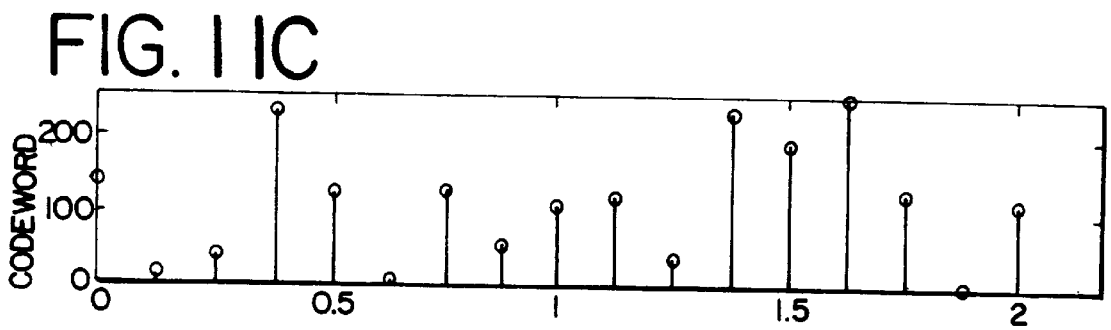
Figure 11D:
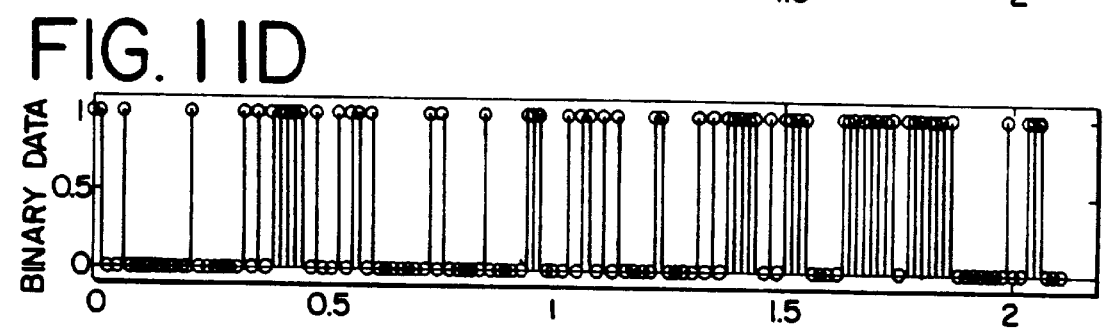
Figure 11E:
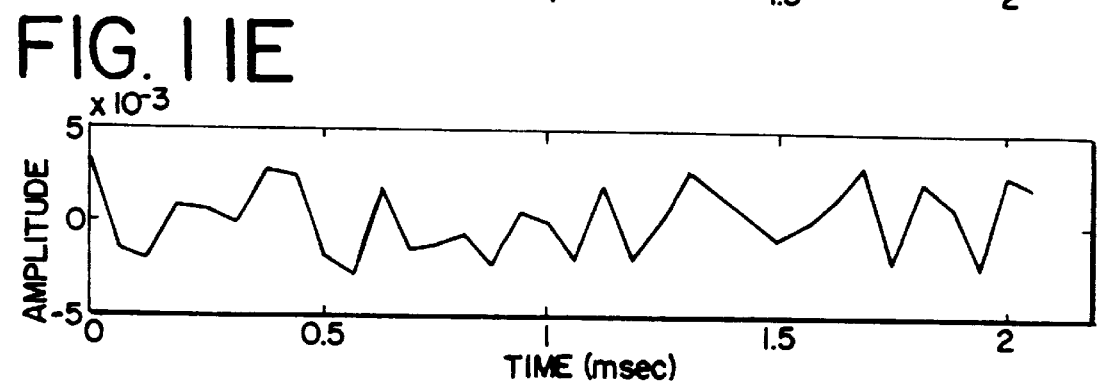
Figure 12:
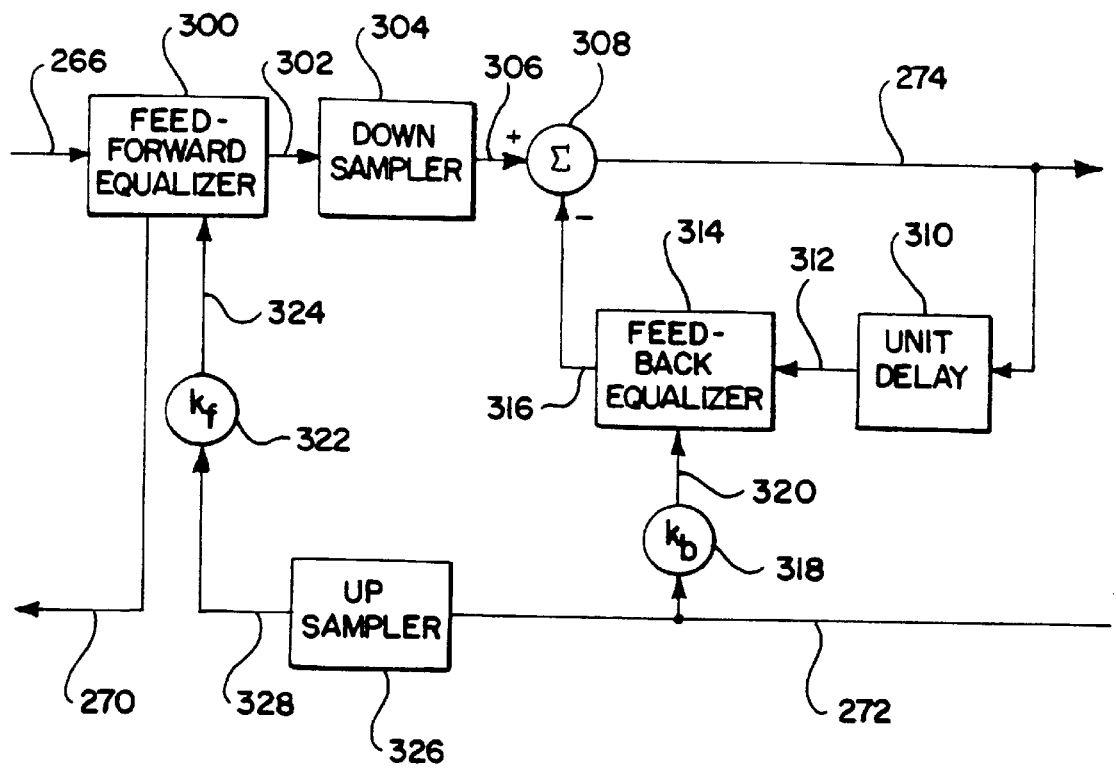
Figure 13:
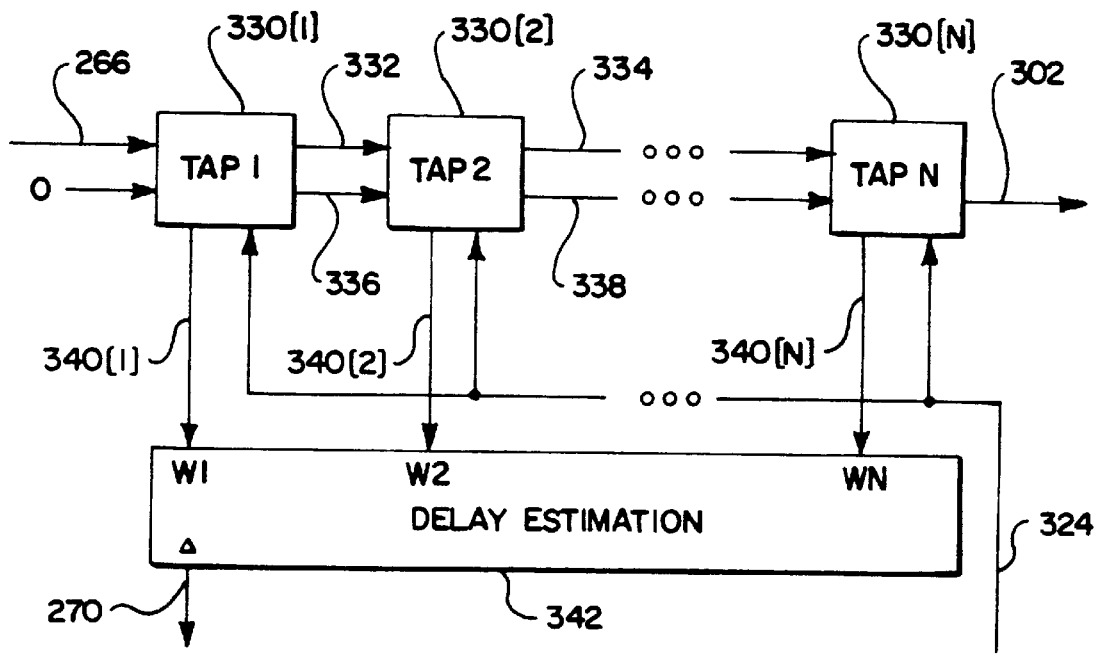
Figure 14:
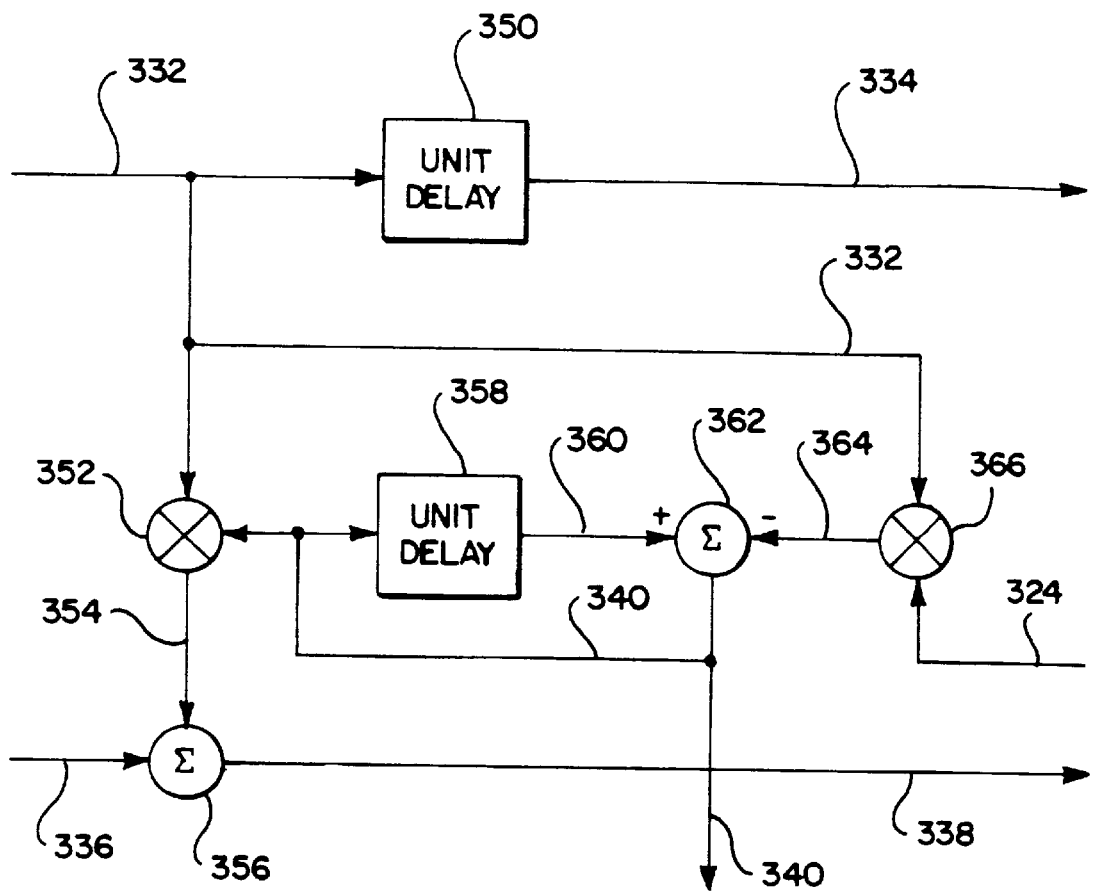
Figure 15:
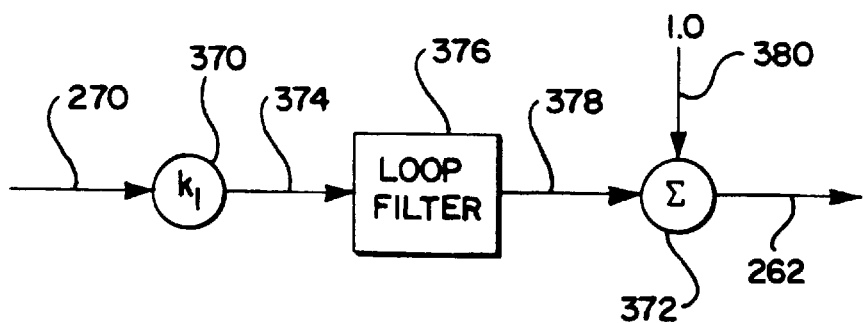
Figure 16:
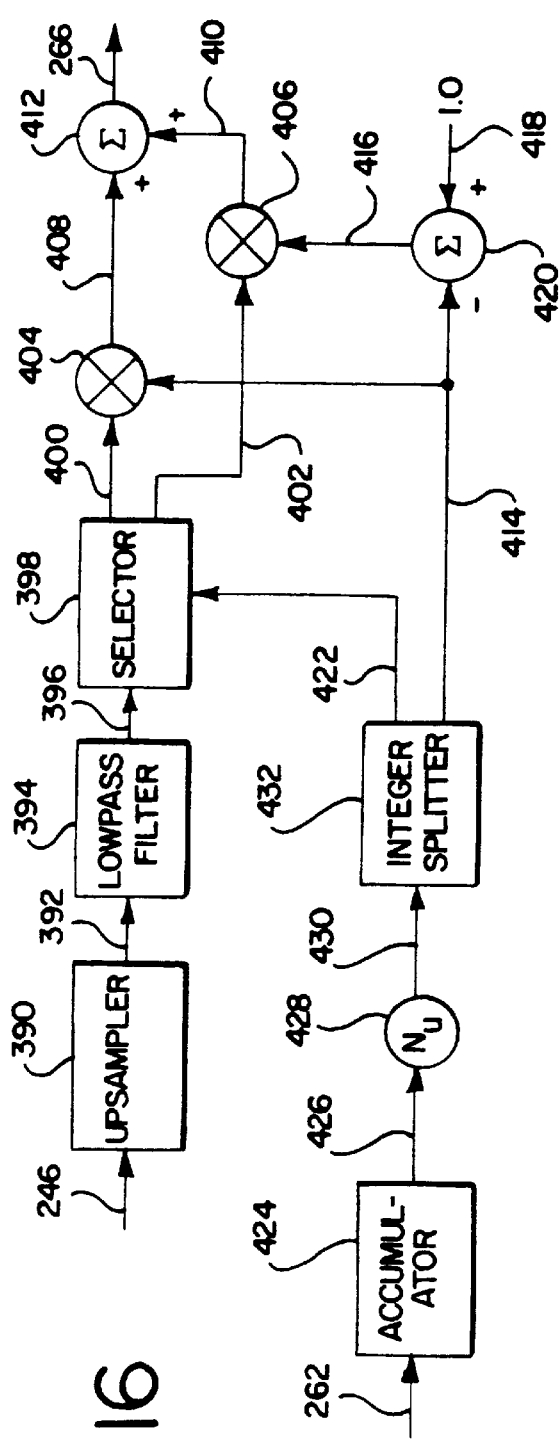
Figure 17:
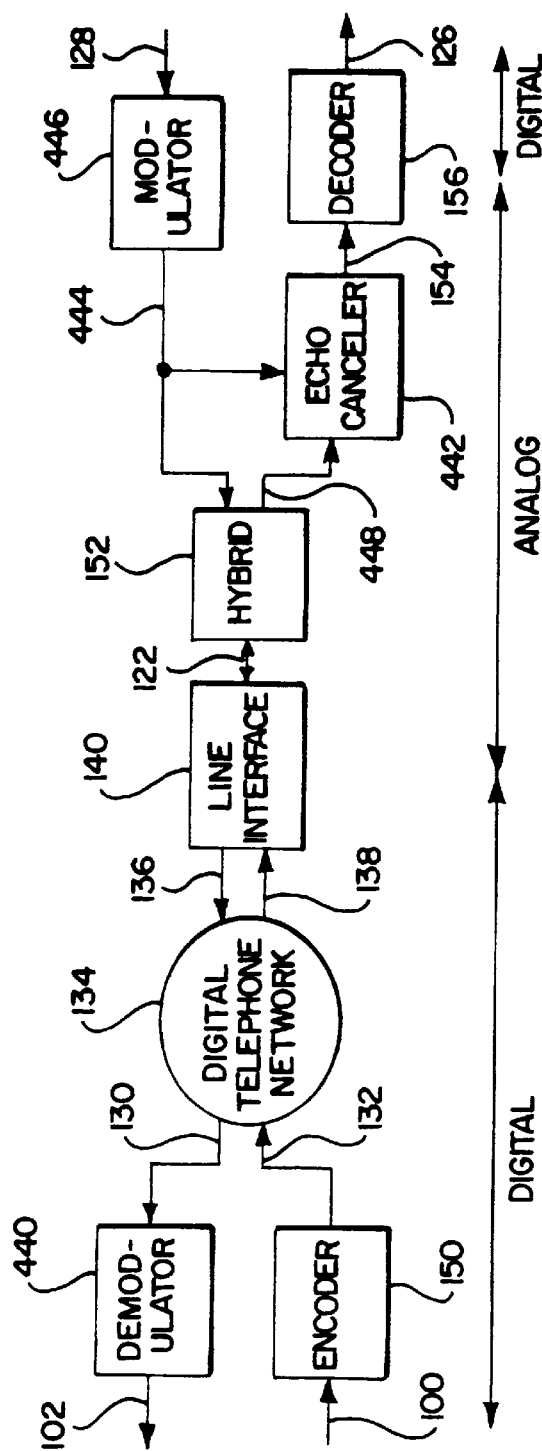
Figure 18:
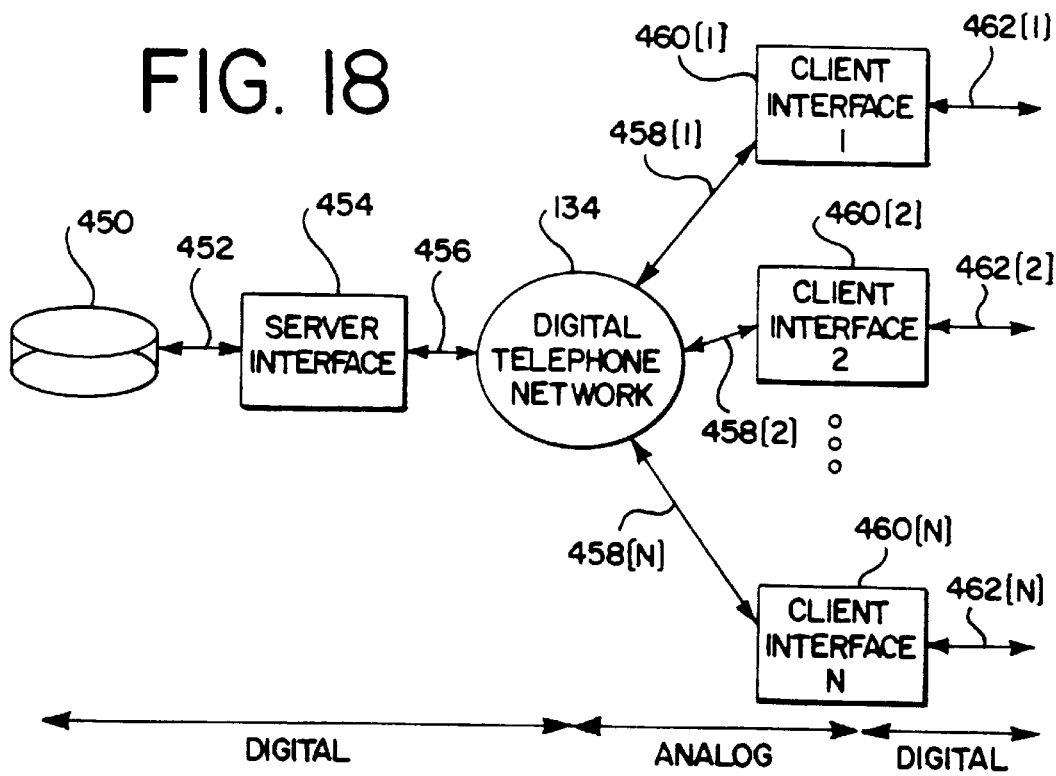
Figure 19:
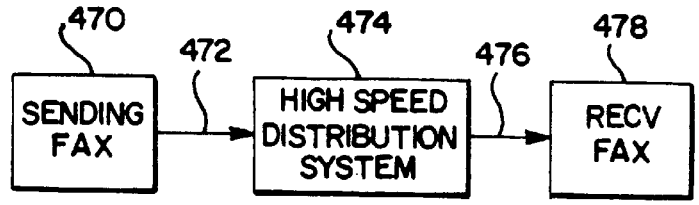
Figure 20:
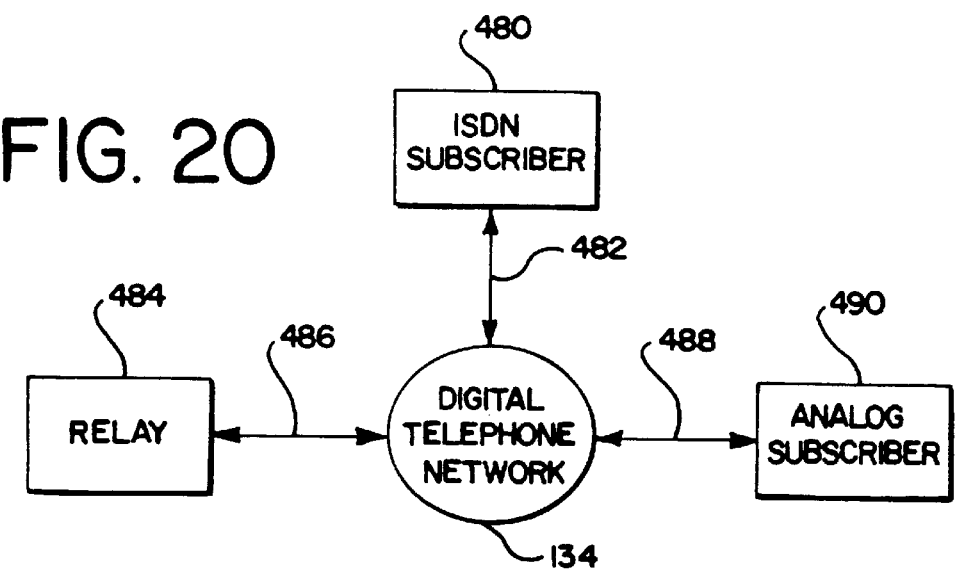

FIG. 8 is a block diagram showing the function of existing digital line interfaces, for reference in understanding an aspect of the present invention;

FIG. 9 is a block diagram of a hardware implementation of a decoder 156 shown in FIG. 3, in accordance with an aspect of the present invention;

FIG. 10 is a block diagram showing the function of decoder 156 of FIG. 3, in accordance with an aspect of the present invention;

FIG. 11a is a graph of an analog signal 154 of FIG. 10 as a function of time, in accordance with an aspect of the present invention;

FIG. 11b is a graph of a compensated signal 274 of FIG. 10 as a function of time, formed within decoder 156 in accordance with an aspect of the present invention;

FIG. 11c is a graph of an estimated code stream 280 of FIG. 10 as a function of time, formed within decoder 156 in accordance with an aspect of the present invention;

FIG. 11d is a graph of a data stream 126 of FIG. 3 as a function of time, generated by decoder 156 in accordance with an aspect of the present invention;

FIG. 11e is a graph of an error signal 272 of FIG. 10 as a function of time, generated by decoder 156 in accordance with an aspect of the present invention;

FIG. 12 is a block diagram showing an inverse filter 268 of FIG. 10, in accordance with an aspect of the present invention;

FIG. 13 is a block diagram showing a feed-forward equalizer 300 of FIG. 12, in accordance with an aspect of the present invention;

FIG. 14 is a block diagram showing a filter tap 330 of FIG. 13, in accordance with an aspect of the present invention;

FIG. 15 is a block diagram showing a clock estimator 264 of FIG. 10, in accordance with an aspect of the present invention;

FIG. 16 is a block diagram showing the function of a clock synchronizer 260 of FIG. 10, in accordance with an aspect of the present invention;

FIG. 17 is a block diagram showing an end-to-end asymmetric system with a reverse channel in accordance with an aspect of the present invention;

FIG. 18 is a block diagram showing an application of an aspect of the present invention with a database server;

FIG. 19 is a block diagram showing an aspect of the present invention in an application to a high speed facsimile system;

FIG. 20 is a block diagram showing a digital telephony relay in accordance with an aspect of the present invention.

DETAILED DESCRIPTION OF THE PREFERRED EMBODIMENTS

Conventional Modem Data Connection

Figure 1:
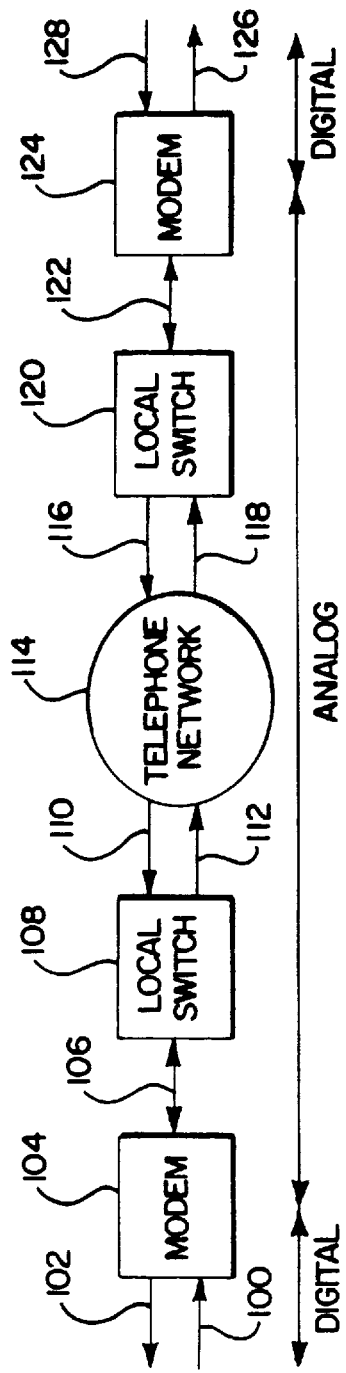
FIG. 1 is a block diagram showing a typical modem data connection.

A conventional modem data connection is shown in FIG. 1. Operation of such a system is well known and has been standardized by government agencies such as the International Telecommunications Union. Depending on the types of a modem 104 and a modem 124, data may be applied at rates of up to 28,800 bits/second via the first users data stream 100. Modem 104 converts data stream 100 into an analog signal, which is applied to a local loop 106, which in turn connects to a telephone switch 108. The analog signal is then carried through a telephone network 114 via a network connection 112 and eventually reaches, via a network connection 118, a telephone switch 120 serving the second user. The signal is then passed, in analog form, via a local loop 122 to the second user's modem 124, which converts the signal to data stream 126, which will be a delayed version of data stream 100. In an exactly analogous way, a data stream 128 travels through the telephone network via modem 124, local loop 122, telephone switch 120, a network connection 116, telephone network 114, a network connection 110, telephone switch 108, local loop 106, and modem 104 to form a delayed version as a data stream 102.

This system assumes that the telephone system reproduces the analog signal, applied at one user's telephone connection, at the other user's end with distortion and delay not greater than a set of standard values specified for the telephone system. One can show that, based only on these values, it is not possible to transmit data at rates greater than approximately 35,000 bits/second. This system ignores many details of the distortion, which may, in fact, be deterministic changes to the signal rather than unpredictable changes. One such deterministic change is quantization noise if telephone network 114 is implemented digitally. Existing modems cannot make use of knowledge of this significant noise source in eliminating distortion and are thus limited in their data rates. This is the key shortcoming of existing modem systems—low data rate and a theoretical limit on the maximum improvement that will ever be possible within the current framework of assumptions.

Figure 2:
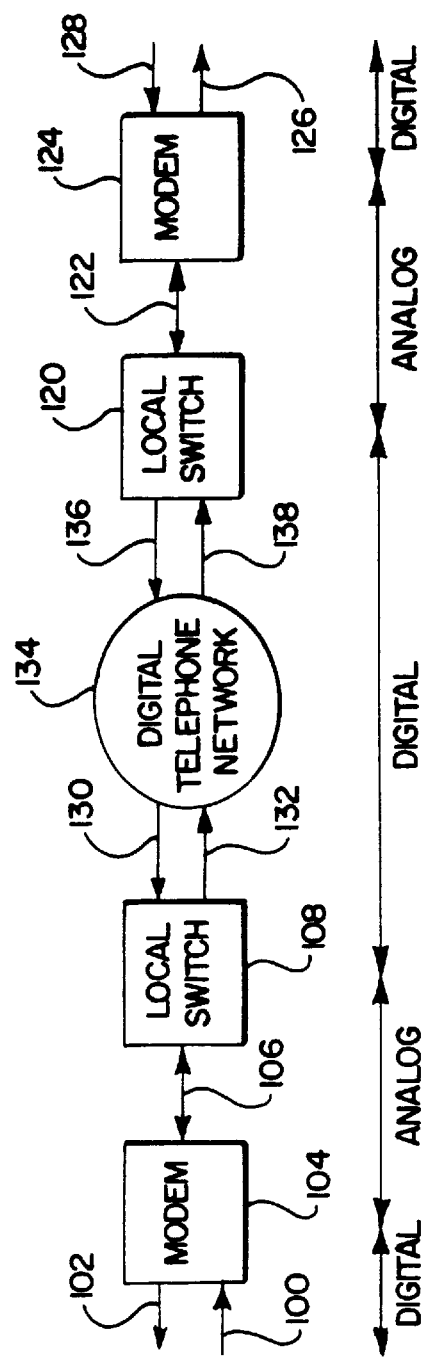
FIG. 2 is a block diagram showing an example of a hypothetical symmetric digital system.

In an attempt to overcome the foregoing shortcomings and disadvantages of a conventional modem data connection as shown in FIG. 1, an approach to increasing the rate of data transfer has resulted in a hypothetical symmetric digital communication system. Such a system is shown in combination with a digital telephone network in FIG. 2.

This system, described by Kalet et al. in the previously cited reference, is similar to existing modems but with a new assumption; that the underlying infrastructure is a digital telephone network 134. The operation is similar to that of the conventional modem system described above except that the signals are carried in digital form within digital telephone network 134 and on a digital network connection 130, digital network connection 132, a digital network connection 136, and a digital network connection 138. Each user still requires a modem to transfer the information via local loop 122 and local loop 106 to telephone switch 120 and telephone switch 108 respectively where conversion between analog and a standard digital format used by digital telephone network 134 is performed.

Unlike conventional modems, no theoretical argument has yet been found which would limit the speed of such a system to less than that used internally within digital telephone network 134, typically 56,000 or 64,000 bits/second. Thus, it is hypothetically possible that such a system could obtain data rates up to 64,000 bits/second. However, such a system has never been reduced to practice nor is there any evidence that it would be possible to implement such a system. The authors of this system state that "This is a hard practical problem and we can only conjecture if a reasonable solution would be possible."

The problem is that to make use of the knowledge that the underlying network is digital and a large part of the observed signal distortion is due to quantization noise, the transmitting modem must control, via only its analog output, the digital levels chosen by the network to encode the signal. Furthermore, the receiving modem must, via only its analog input, accurately infer those digital levels. Distortion due to analog/digital conversion occurs at both the transmitter and receiver's end yet only the combined distortion added to the desired signal is directly observable. Furthermore, additional distortion due to electrical noise and crosstalk also occurs on local loop 122 and local loop 106. Separating out these distortion components from the desired signal and each other is a difficult, perhaps impossible, task.

One aspect of the present invention is a method by which the shortcomings of this approach are eliminated. It makes use of knowledge of the underlying digital network in a way that is realizable, providing higher attainable data rates than possible with any other known solution.

Sampling Rate Conversion

As will be seen in subsequent discussion, a system for recovering PCM data from a distorted analog representation requires a method of synchronizing the decoding clock with that used to convert the PCM data from a digital stream to analog values. Digital implementations of this synchronization require that a digital data sequence be resampled, changing its rate from that used by an analog-to-digital converter to one which is closer to that used in conversion from PCM data. Previously known techniques for achieving this are either strictly limited in their capabilities, or are computationally intensive. See, for example, R. E. Crochiere and L. R Rabiner, "*Multirate Digital Signal Processing*," Prentice-Hall, Englewood Cliffs, N.J., 1983, which is hereby incorporated herein by reference. Performing sampling rate conversion between two independent clocks whose relationship may change as a function of time further complicates the task.

One aspect of the present invention is a method which can perform such conversion with a minimum of computational overhead. It accepts a continuously-variable input/output sampling rate ratio and performs the conversion with high accuracy. The techniques described can obtain greater than 90 dB anti-aliasing rejection and can be implemented in real-time on existing processors.

Overall System

FIG. 3 shows an overview of the proposed system. The method of use of the system shown in FIG. 3 is identical to that for current data communications circuits or modems. Data applied at data stream 100 will appear some time later at data stream 126. Data stream 100 to applied to encoder 150 whose function is to convert the data stream into a format compatible with the telephone system. The converted data is applied to digital telephone network 134 via digital network connection 132. The converted data emerges verbatim via digital network connection 138 at a client's telephone central office where a line interface 140 is located. At this point, if the client also had direct digital access to the digital connection to the client's line interface from digital network connection 138, the transmission would be complete. However, where the client, like the majority of users, does not have direct digital access to the telephone network, this is not possible, and the following additional operations are required.

Line interface 140 converts the digital data on digital network connection 138 into an analog form in a manner conforming to the standardized specifications of digital telephony. The analog form is carried on local loop 122 to the client's premises where a hybrid network 152 terminates the line and produces analog signal 154. Hybrid network 152 is a standard part which converts the two-wire bidirectional signal to a pair of one-way signals. Decoder 156 uses analog signal 154 to estimate and compensate for the distortion introduced by the conversion to analog form performed by line interface 140, resulting in an estimate of the digital data at digital network connection 138, which is assumed to be identical to the digital data that was applied at digital network connection 132. The transformation performed by encoder 150 is then inverted and decoder 156 outputs data stream 126, which is a delayed estimate of the original data stream 100.

Note that within FIG. 3, all elements are well known and exist within current digital telephone systems except encoder 150 and decoder 156, which will be described in detail below. Also to be described below, is a method of initializing and adapting decoder 156 to the exact conditions encountered in normal operation.

Physical Implementation of Encoder

FIG. 4 shows a block diagram of one possible realization of encoder 150 of FIG. 3. Data stream 100 from FIG. 3 is applied to the serial data input of a digital signal processor 160 such as an AT&T DSP32C. This processor uses a processor bus 162 to communicate with a read-only memory 168, a random access memory 166, and an ISDN interface circuit 164 such as an Advanced Micro Devices Am79C30A. Read-only memory 168 contains a stored-program whose functional characteristics will be described in following sections. Random access memory 166 is used for program storage and parameters. ISDN interface circuit 164 also has an ISDN connection 170, which is connected to a network terminator 172, such as Northern Telecom NT1, and subsequently to digital network connection 132, which was also shown in FIG. 3.

To produce a fully-functional implementation, additional secondary elements such as decoders, oscillators, and glue logic would need to be added to the basic block diagram shown in FIG. 4. Such additions are well known and will be evident to those skilled in the art.

Subsequent discussion of encoder 150 will refer to functional rather than physical components, all of which can, for example, be implemented as programs or subroutines for digital signal processor 160 using well-known digital signal-processing techniques.

Encoder Operation

Figure 5:
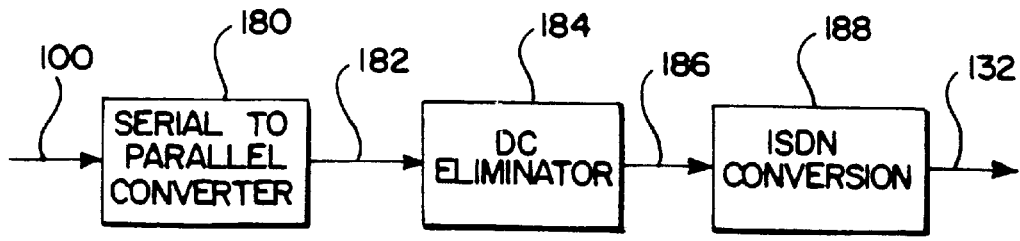
FIG. 5 is a block diagram showing the function of encoder 150 of FIG. 3, in accordance with an aspect of the present invention.

FIG. 5 shows a functional block diagram of encoder 150 of FIG. 3. The channel from server to client begins with arbitrary digital data provided as data stream 100. Encoder 150 converts this bitstream into a sequence of eight-bit words sampled, preferably, at the telephone system's clock rate of 8,000 samples/second. This is achieved by a sequence of operations beginning with a serial-to-parallel converter 180, which groups together each eight bits read from data stream 100, outputting a stream of parallel eight-bit values as an 8-bit code stream 182. This mapping may preferably be performed such that the first of each eight bits read from data stream 100 is placed in the least-significant bit position of 8-bit code stream 182 with subsequent bits occupying consecutively more significant bit positions until the output word is complete, at which point the process repeats. DC eliminator 184 then inserts additional eight-bit values at regular intervals, preferably once per eight samples, such that the analog value associated with the inserted value is the negative of the sum of all prior values on 8-bit code stream 182. This is necessary since telephone systems frequently attenuate or remove any DC bias on a signal. DC eliminator 184 is one example of a circuit means for reducing DC components in the received analog signal.

Figure 6:
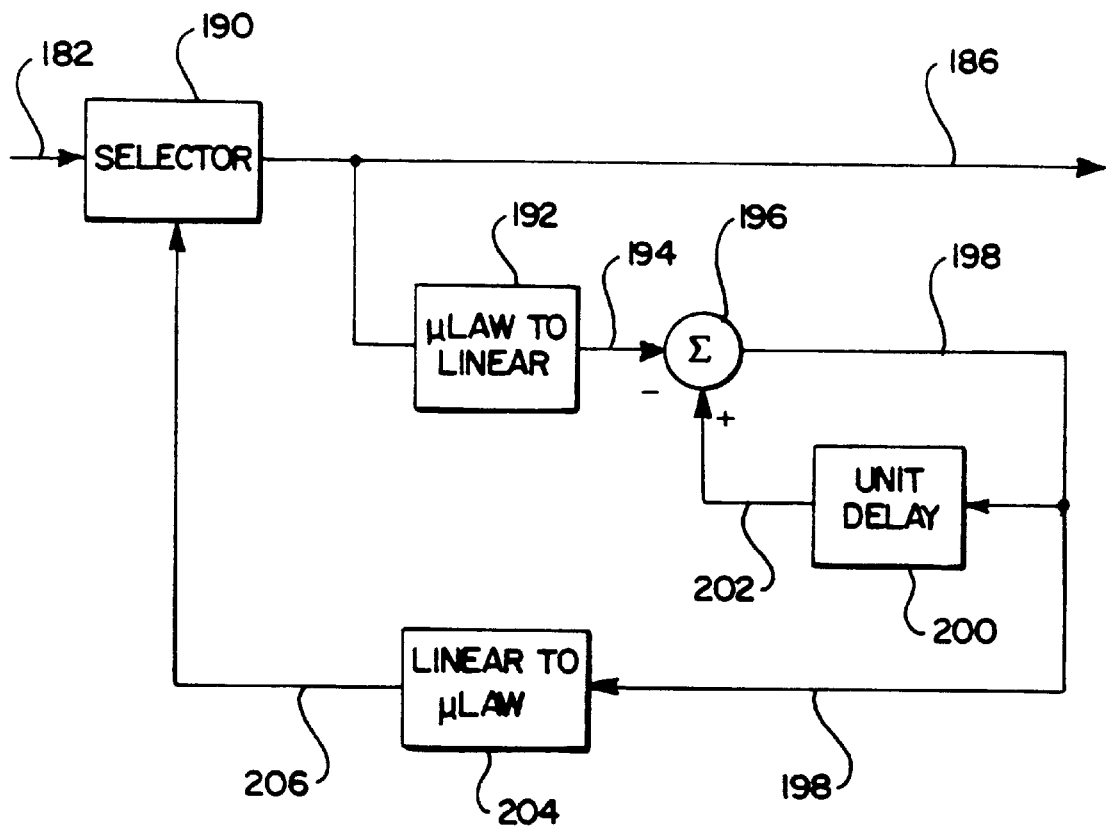
FIG. 6 is a block diagram showing the function of a DC eliminator 184 of FIG. 5, in accordance with an aspect of the present invention.

A detail of the functional elements of DC eliminator 184 of FIG. 5 is shown in FIG. 6. A code stream 186 output from a two-input selector 190 is also converted to linear value 194 by a μ-law-to-linear converter 192, which can be implemented as a 256-element lookup table using the standard μ-law-to-linear conversion table. Values of linear value 194 are accumulated and negated by a summer 196 and a unit delay 200 to form a DC offset 198 and a previous DC offset 202, which is the corresponding unit-delayed value. DC offset 198 is applied to a linear-to-$\mu$-law converter 204, which can use the same lookup table as $\mu$-law-to-linear converter 192, but performing the inverse mapping. Note that if DC offset 198 is greater than or less than the maximum or minimum value in the table, the respectively largest or smallest entry will be used. A DC restoration code 206 is produced by linear-to-$\mu$-law converter 204 and applied as one input to two-input selector 190. Two-input selector 190 operates by reading, preferably seven, sequential values from 8-bit code stream 182 and outputting these values as code stream 186, followed by reading and outputting a single value from DC restoration code 206. It then repeats this sequence of operations continually.

Returning to FIG. 5, code stream 186 is applied to the input lead of an ISDN converter 188, which provides the well-known conversion to an ISDN signal. The function of ISDN converter 188 is implemented directly by several existing integrated circuits, including an Advanced Micro Devices Am79C30. The output of ISDN converter 188 forms digital network connection 132, which is also the output of encoder 150 of FIG. 3.

Figure 7A:
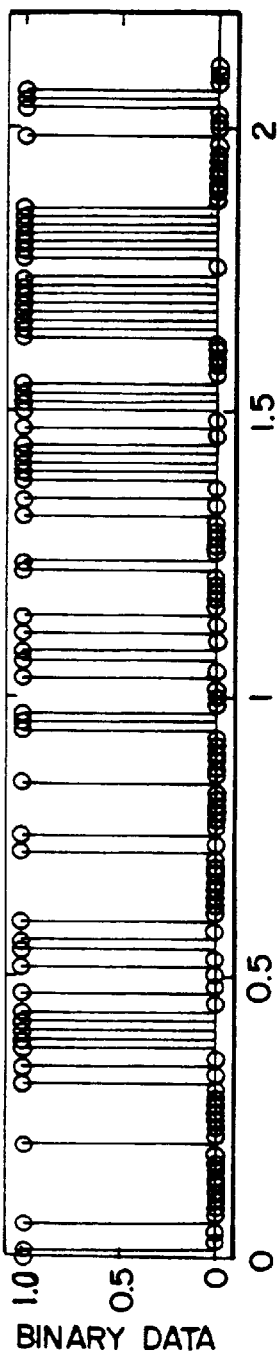
FIG. 7a is a graph of a data stream 100 as a function of time, such as would be applied to encoder 150 in accordance with an aspect of the present invention.
Figure 7B:
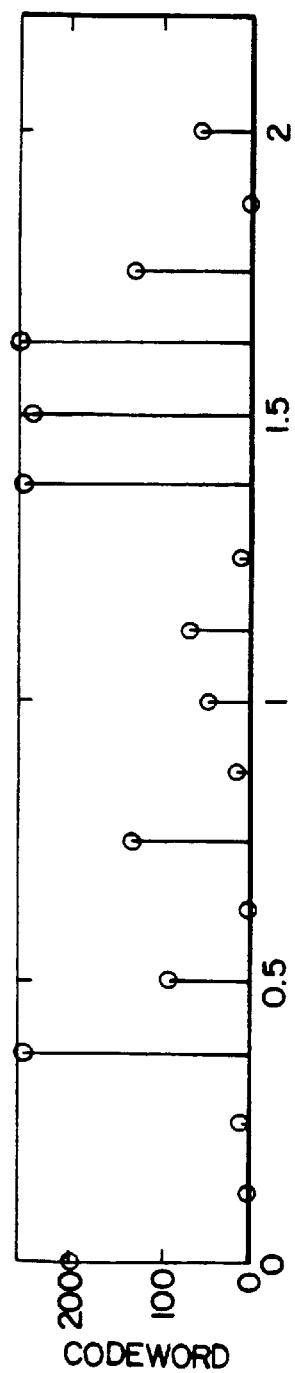
FIG. 7b is a graph of a typical output from encoder 150 as a function of time, such as would be applied to a digital network connection 132 of FIG. 3, in accordance with an aspect of the present invention.
Figure 7C:
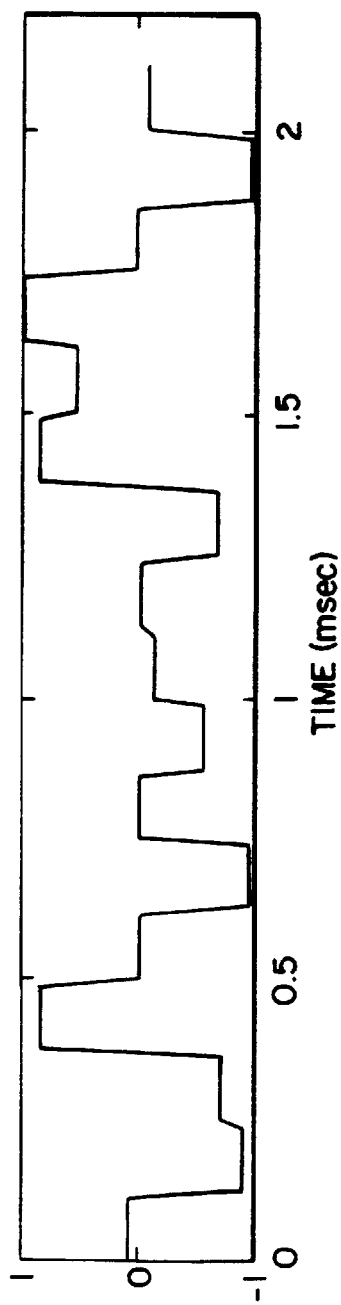
FIG. 7c is a graph of a linear value 194 of FIG. 6 as a function of time; this is the output signal from encoder 150 after conversion to linear form, in accordance with an aspect of the present invention.

For further understanding, some of the signals used by encoder 150 are illustrated in FIGS. 7a through 7c. FIG. 7a shows a sequence of samples of data stream 100. After processing by serial-to-parallel converter 180 and DC eliminator 184, code stream 186 is shown in FIG. 7b. Within DC eliminator 184, the linear equivalent of code stream 186, namely linear value 194, is shown in FIG. 7c.

Line Interface

For reference during subsequent descriptions, FIG. 8 shows a functional model of line interface 140 of FIG. 3, such as would be found in a typical telephone system for use with an aspect of the present invention. Note that such interfaces are well known and are currently used in digital telephone switches. Digital telephone network 134 of FIG. 3 passes an eight-bit-per-sample, $\mu$-law-encoded, digital data-stream via digital network connection 138 to a $\mu$-law-to-linear converter 210, shown in FIG. 8. $\mu$-law-to-linear converter 210 implements the well-known $\mu$-law-to-linear conversion, converting each sample to a linear value 212. Linear value 212 is then converted to an analog signal 216 by a digital-to-analog converter 214 that is sampled using a telephone system clock 236 in a well known manner. Although not shown in FIG. 3 for reasons of clarity, telephone system clock 236 is generated by digital telephone network 134. Analog signal 216 is then smoothed by a lowpass filter 218 to form a filtered signal 220. The main purpose of lowpass filter 218 is to provide a low-pass function with a cutoff frequency of approximately 3100 Hz. The International Telecommunications Union has standardized the specifications for digital-to-analog converter 214 and lowpass filter 218 in International Telecommunication Union, Telecommunication Standardization Sector (ITU-T), *"Transmission Performance Characteristics of Pulse Code Modulation,"* Recommendation G.712, Geneva, Switzerland, September 1992, which is hereby incorporated by reference.

Filtered signal 220 is multiplexed onto local loop 122 by a four-to-two-wire converter 222. Local loop 122 is bidirectional; incoming signals on local loop 122 are applied to four-to-two-wire converter 222 and are output as an unfiltered signal 234. Unfiltered signal 234 is applied to a bandpass filter 232, which has also been standardized by ITU-T in the above cited reference. The output from bandpass filter 232, a filtered signal 230, is converted to a linear value 226 by an analog-to-digital converter 228. Linear value 226 is then converted to digital network connection 136 by a linear-to-$\mu$-law converter 224, which implements the standard linear-to-$\mu$-law conversion. Note that in the system shown in FIG. 3, digital network connection 136 is not used and has been omitted for clarity.

Physical Implementation of Decoder

FIG. 9 shows a block diagram of one possible realization of decoder 156 of FIG. 3. Analog signal 154 from FIG. 3 is sampled by an analog-to-digital converter 240, which exists as an integrated circuit, such as a Crystal Semiconductor CS5016. This uses a clock signal 244, preferably at 16 kHz, generated by an oscillator 242, to form a digital input signal 246, which is connected to a bank of digital signal processors 248, such as AT&T DSP32C's, via one of their serial digital input leads. The processors are also connected to each other and to a random access memory 254 and a read-only memory 252 via a processor bus 250. Read-only memory 252 contains a stored-program whose functional characteristics will be described in following sections. Bank of digital signal processors 248 produces data stream 126, which is the final output of decoder 156 of FIG. 3.

To produce a fully-functional implementation, additional secondary elements such as decoders, oscillators, and glue logic would need to be added to the basic block diagram shown in FIG. 9. Such additions are well known and will be evident to those skilled in the art.

Subsequent discussion of decoder 156 will refer to functional rather than physical components, all of which can, for example, be implemented as programs or subroutines for the bank of digital signal processors 248 using well-known digital signal-processing techniques.

Decoder Operation

FIG. 10 shows the functional structure of decoder 156 of FIG. 3. Analog signal 154 from FIG. 3 provides the input data to decoder 156. Analog signal 154 is fed to analog-to-digital converter 240 and converted to digital input signal 246, preferably sampled at 16,000 samples per second with 16 bits per sample precision. Analog-to-digital converter 240 exists as an integrated circuit, such as a Crystal Semiconductor CS5016. Digital input signal 246 is then processed by clock synchronizer 260 which interpolates and resamples digital input signal 246 at intervals separated by a period estimate 262 to produce a synchronized signal 266. The operation of clock synchronizer 260 will be detailed in following sections. Synchronized signal 266 is filtered by inverse filter 268, which will be described below, to reconstruct compensated signal 274. The purpose of inverse filter 268 is to invert the transformation performed by line interface 140 of FIG. 3 of which the primary component is lowpass filter 218 of FIG. 8. Returning to FIG. 10, inverse filter 268 also outputs a delay error estimate 270 giving the timing error inherent in synchronized signal 266, which will be used by clock estimator 264, described below, to compute the period estimate 262 used by clock synchronizer 260. A decision means is then used to convert compensated signal 274 to a sequence of values from a discrete set. As an example, compensated signal 274 is converted to the nearest equivalent eight-bit $\mu$-law word using a linear-to-$\mu$-law converter 276 to give estimated code stream 280. As described earlier, linear-to-$\mu$-law converter 276 may be implemented as a simple lookup table.

During normal operation, a switch 292 gates estimated code stream 280 back as a desired output signal 286, which is converted back to a linear signal by a $\mu$-law-to-linear converter 278 to form a linear value 284 $\mu$-law-to-linear converter 278 can be implemented as a simple lookup table as earlier described. During initialization, switch 292 will be set such that a predetermined training pattern 288 (not shown in FIG. 3) is gated to desired output signal 286. This usage will be described below.

Linear value 284 provides an estimate of the desired value of compensated signal 274. It is used to adaptively update inverse filter 268 such that compensated signal 274 is as close as possible to linear value 284. This adaptation is one example of a training means for adjusting the parameters of decoder 156, which will be further explained in the discussion of inverse filter 268 below. A subtracter 282 computes error signal 272 using compensated signal 274 and linear value 284. Error signal 272 is fed back to an input lead of inverse filter 268 in a feedback loop. Estimated code stream 280 is also passed through a data extractor 290, which inverts the transformations performed by encoder 150 of FIG. 3, to form the decoder's final output data stream 126.

For purposes of understanding only, examples of some of the signals present in FIG. 10 are plotted in FIGS. 11a through 11e. FIG. 11a shows a typical input analog signal 154 to decoder 156, as a function of time. During processing of this signal, decoder 156 forms compensated signal 274, which is illustrated in FIG. 11b. This signal is further processed to form estimated code stream 280, shown in FIG. 11c. Finally, data extractor 290 of FIG. 10 outputs data stream 126 shown in FIG. 11d. Error signal 272, formed for internal use within decoder 156, is shown in FIG. 11e.

As mentioned above, analog-to-digital converter 240, subtracter 282, linear-to-$\mu$-law converter 276, switch 292, and $\mu$-law-to-linear converter 278, all of FIG. 10, are well known and may be easily implemented by anyone skilled in the art. Following discussion will expand upon the implementation and operation of the remaining blocks; inverse filter 268, clock estimator 264, clock synchronizer 260, and data extractor 290.

Inverse Filter

FIG. 12 shows the internal details of inverse filter 268 of FIG. 10. Inverse filter 268 is an example of an equalization means, which operates by performing linear filtering operations on an input signal (synchronized signal 266), to produce an output signal (compensated signal 274). Inverse filter 268 also receives error signal 272 that indicates the mismatch between compensated signal 274 and a desired value. It uses error signal 272 to update its filtering function such that error signal 272 in minimized. Such adaptive filter structures are well known; See for example Richard D. Gitlin, Jeremiah F. Hayes and Stephen B. Weinstein, *"Data Communications Principles,"* Plenum (1992), incorporated herein by reference. However, for purposes of clarification we will describe herein a preferred implementation of inverse filter 268. In addition, inverse filter 268 forms delay error estimate 270, which is used by clock estimator 264 of FIG. 10.

Synchronized signal 266 is fed to feed-forward equalizer 300, which produces a partially-compensated signal 302 while using a correction signal 324 to perform adaptive updates. The operation of feed-forward equalizer 300 will be described below. Feed-forward equalizer 300 also outputs delay error estimate 270, which will be used by clock estimator 264 of FIG. 10. Partially-compensated signal 302 is subsequently down-sampled by a factor of two by a downsampler 304 to form a downsampled signal 306. Downsampler 304 operates by repeatedly reading two consecutive values from its input lead and placing the first of these on its output lead, discarding the second value. Downsampled signal 306 is then applied to a subtracter 308 to form compensated signal 274. Compensated signal 274 is used by subsequent stages in FIG. 10 and is also fed into a unit delay 310 to form a delayed signal 312. Delayed signal 312 is then applied to the input lead of a feed-back equalizer 314 to form a distortion estimate 316. Feed-back equalizer 314 is similar to feed-forward equalizer 300 and will be further described below. Distortion estimate 316 provides the second input to subtracter 308. Error signal 272 of FIG. 10 is scaled by a constant factor at a gain element 318 of FIG. 12 to form a correction signal 320, which is applied as a second input signal to feed-back equalizer 314. Feed-back equalizer 314 uses correction signal 320 to perform adaptive updates.

Error signal 272 is also up-sampled by a factor of two by an upsampler 326, which inserts a zero between each sample of error signal 272. Upsampler 326 produces an up-sampled error signal 328, which is subsequently scaled by a gain element 322 to provide correction signal 324. The use of correction signal 320 and correction signal 324 by feed-back equalizer 314 and feed-forward equalizer 300 respectively will be described below. The values of the parameters kf and kb of gain element 322 and gain element 318 respectively may, preferably, be in the range 10–2 to 10–15. Optimal values may easily be obtained by those skilled in the art without undue experimentation.

Feed-forward and Feed-back Equalizers

FIG. 13 shows the internal structure of feed-forward equalizer 300 of FIG. 12. Feed-forward equalizer 300 is composed of, preferably 8–128, identical copies of filter tap 330 connected in a chain. Any convenient number of tap can be implemented. The first filter tap 330 accepts synchronized signal 266 of FIG. 12 and the last filter tap 330 outputs partially-compensated signal 302 used in FIG. 12. Each intermediate tap takes two input signals: a primary input 332 and a target input 336, to form two output signals: a primary output 334 and a target output 338. Each filter tap 330 also provides, as an output signal, a tap weight 340, which is used by a delay estimator 342 to compute delay error estimate 270. During operation, each filter tap 330 performs adaptive updates using, as an input, correction signal 324.

FIG. 14 shows the details of the function of each filter tap 330 of FIG. 13. Each tap has two inputs, primary input 332 and target input 336, and provides two outputs, primary output 334 and target output 338, using standard signal processing blocks as shown in FIG. 14. Primary input 332 is delayed by one sample by a unit delay 350 to form primary output 334. Meanwhile, primary input 332 is also multiplied by tap weight 340 using a multiplier 352 to give a weighted input 354. Weighted input 354 is added to target input 336 by a summer 356 to give target output 338.

Adaptive update of tap weight 340 is performed by multiplying correction signal 324 by primary input 332 using a multiplier 366. A multiplier output value 364 provides a tap error estimate and is subtracted from a previous value 360 to form tap weight 340 using a subtracter 362. Previous value 360 is formed by a unit delay 358 using tap weight 340 as input. Each filter tap 330 also outputs tap weight 340.

Returning to FIG. 13, each filter tap 330 is fed to delay estimator 342. Delay estimator 342 calculates delay error estimate 270 of the overall filter using the equation:

$$\Delta = \frac{\sum_{i=1}^{i=N} i \cdot w_i}{\sum_{i=1}^{i=N}} - \frac{N}{2}$$

where $w_i$ is an abbreviation for the i-th tap weight 340. In this way, delay estimator 342 provides an estimation means for determining a degree of error in period estimate 262 of FIG. 10.

The above description of feed-forward equalizer 300 of FIG. 10 also applies to feed-back equalizer 314. The structure and operation of feed-back equalizer 314 are identical to that of feed-forward equalizer 300 with the exception that delay estimator 342 is not needed, so there is no equivalent to the delay error estimate 270 output. Also, feed-back equalizer 314 may use a different number of taps than feed-forward equalizer 300, preferably between one-quarter and one-half the number. The optimal number of taps to use for both feed-forward equalizer 300 and feed-back equalizer 314 can be easily obtained by one skilled in the art without undue experimentation.

Clock Estimator

FIG. 15 shows the functional components of clock estimator 264 of FIG. 10. Clock estimator 264 is one example of a circuit means that uses delay error estimate 270 to update period estimate 262. The signal input to clock estimator 264, delay error estimate 270, is scaled by a factor of $k_f$, preferably in the range $10^{-1}$ to $10^{-8}$, but dependent on the accuracy of the clock used for analog-to-digital converter 240, by a loop gain 370 to form phase error 374. Phase error 374 is then filtered with loop filter 376 to form period offset 378. Loop filter 376 is a low-pass filter whose design will be evident to those skilled in the design of phase-locked loops. Period offset 378 is added to nominal period 380 by summer 372 to create period estimate 262. Nominal period 380 is the a priori estimate of the ratio of half of the sampling rate of analog-to-digital converter 240 of FIG. 10 to the frequency of telephone system clock 236 of FIG. 8. Since telephone system clock 236 and the clock used by analog-to-digital converter 240 are not derived from a common source, the exact ratio will differ very slightly from 1.0 for the preferred choices of parameters. During operation, period estimate 262 will refine and track this ratio using estimates of the current error provided by inverse filter 268 of FIG. 10.

Clock Synchronizer

A functional block diagram of clock synchronizer 260 of FIG. 10 is shown in FIG. 16. The function of clock synchronizer 260 is to interpolate and resample its input signal (digital input signal 246) at intervals separated by period estimate 262. For example, if period estimate 262 had a value of 2.0, every second sample read from digital input signal 246 would be output as synchronized signal 266. If period estimate 262 is not an integer, then clock synchronizer 260 will be required to appropriately interpolate between input samples to form the output samples.

Clock synchronizer 260 performs one cycle of operation for each output sample required. Each cycle begins with an accumulator 424 reading the value of period estimate 262 of FIG. 10. Accumulator 424 forms a running sum of all inputs values read and outputs this sum as a real-valued sample index 426. This is scaled by a factor of $N^u$, preferably in the range of 10–400, using a gain element 428 to form an upsampled sample index 430. The optimal value of $N^u$ can easily be obtained by one skilled in the art without undue experimentation. An integer/fraction splitter 432 decomposes upsampled sample index 430 into a sample index 422 and a fractional value 414. For example, if upsampled sample index 430 had a value of 10.7, integer/fraction splitter 432 would set sample index 422 to 10.0 and fractional value 414 to 0.7.

One of the input signals applied to a sample selector 398 is formed by a string of operations starting with digital input signal 246. An upsampler 390 reads a value from digital input signal 246 and outputs $N^u$ samples consisting of the value read from digital input signal 246 followed by $N^u-1$ zero values. The output stream from upsampler 390, an upsampled input signal 392, is applied to a low-pass filter 394, which has a passband cutoff frequency equivalent to 4 kHz. The design of upsampler 390 and low-pass filter 394 are well known. See, for example, R. E. Crochiere and L. R. Rabiner, "*Multirate Digital Signal Processing*," Prentice-Hall, Englewood Cliffs, N.J., 1983, which is hereby incorporated herein by reference. Low-pass filter 394 forms a filtered upsampled signal 396, which is used as an input to sample selector 398.

Sample selector 398 is an example of a selection means, which reads a value from sample index 422 and interprets this as a sample number, $s^n$. It also maintains an internal count of how many samples it has read from its input lead connected to filtered upsampled signal 396 since the system was initialized. It then reads additional samples from filtered upsampled signal 396 and forms output samples such that a sample 400 is a copy of sample $s^n$ read from filtered upsampled signal 396 and a sample 402 is a copy of sample $s^n+1$. Sample 400 is then scaled by fractional value 414 using a multiplier 404 to form a sample component 408. Similarly, sample 402 is scaled by a fractional value 416 using a multiplier 406 to form a sample component 410. The magnitude of fractional value 416 is one minus the magnitude of fractional value 414, as computed using a subtracter 420, and a unit constant 418. Sample component 408 and sample component 410 are then added by a summer 412 to form synchronized signal 266, which is also the output of clock synchronizer 260 of FIG. 10. The combination of multiplier 404, multiplier 406, and summer 412 is an example of an interpolation means for combining the samples selected by sample selector 398.

Clock synchronizer 260 can also be used in other applications or as a standalone sampling-rate converter. In general synchronized signal 266 is equivalent to digital input signal 246 but with a different sampling rate. The ratio of the two rates is specified by period estimate 262 which may change as a function of time.

Note also that although the linear interpolation may appear to be a coarse approximation to the desired result, it is in fact quite accurate. By virtue of the oversampling performed by upsampler 390, filtered upsampled signal 396 has a frequency spectra that is near zero everywhere except for a narrow band around DC. The interpolation operation effectively creates images of this narrow passband in the frequency domain. The function of the linear interpolation is then to filter out these images. Conventional implementations use a sharp, computationally expensive, low-pass filter to achieve this. Although the linear interpolator is a very poor low-pass filter, it does have very deep spectral notches at exactly the frequencies where the undesired images will appear. It is the combination of the placement of these notches with the narrow alias images that makes this method very accurate while eliminating much of the computation from traditional techniques.

Data Extractor

The last stage of decoder 156 of FIG. 3 is data extractor 290 of FIG. 10. The function of data extractor 290 is to invert the transformations performed by encoder 150 of FIG. 3. These transformations consist of serial-to-parallel converter 180 and DC eliminator 184 shown in FIG. 5.

To invert these transformations, data extractor 290 first removes the values inserted into the data stream by DC eliminator 184. This is done by simply discarding every eighth sample read from the input (assuming the DC elimination was done by DC eliminator 184 using the preferred rate of once per eight samples). Once this is done, the stream of eight-bit values remaining can be converted back into a serial data stream 126 by outputting one bit of each word at a time, starting with the least-significant bit. Such techniques are well known by those skilled in the art.

Initialization of System

When a connection is first established between a server and a client, both encoder 150 and decoder 156 of FIG. 3 must commence in a state known to each other. Within encoder 150 the following initialization is performed:

1. DC eliminator 184 of FIG. 5 is initialized with two-input selector 190 of FIG. 6 set such that its next output will be a copy of DC restoration code 206.
2. The output of unit delay 200 of FIG. 6, previous DC offset 202, is initialized to 0.0.
3. Code stream 186 of FIG. 5 is temporarily disconnected from DC eliminator 184. Instead a known sequence of $N_c$, preferably 16–128, values is repeated $N_t$, preferably 100–5000, times. The optimal values to use for $N_c$ and $N_t$ can be easily obtained by one skilled in the art without undue experimentation.

The choice of $N_c$ above is tied to the design of decoder 156. $N_c$ is preferably one-half of the number of taps in feed-forward equalizer 300 of FIG. 12. Without loss of generality, one possible choice of the sequence of code values repeatedly transmitted by encoder 150 is shown in Table 1. An identical sequence is also used by encoder 150, applied as training pattern 288 in FIG. 10.

TABLE 1

Typical Training Pattern

| 14  | 182 | 29  | 140 | 20  | 138 | 153 | 16 |
| 132 | 205 | 157 | 170 | 4   | 162 | 129 | 12 |
| 8   | 144 | 54  | 134 | 10  | 128 | 6   | 34 |
| 136 | 42  | 77  | 25  | 148 | 1   | 142 | 0  |

Once the $N_t$ repetitions of the sequence have been output, code stream 186 will be reconnected to DC eliminator 184 and subsequent output from decoder 156 will correspond to the input applied as data stream 100 of FIG. 3.

Within decoder 156 of FIG. 3, the following initialization is performed before the first sample is read from analog signal 154:

1. Switch 292 of FIG. 10 is set to gate training pattern 288 to desired output signal 286.
2. Data extractor 290 of FIG. 10 is set so the next input value, estimated code stream 280, will be considered a DC equalization value and thus be discarded.
3. Unit delay 310 of FIG. 12 is initialized to output zero as delayed signal 312.
4. Upsampler 326 of FIG. 12 is initialized such that its next output, up-sampled error signal 328, will be a copy of error signal 272.
5. Downsampler 304 of FIG. 12 is initialized such that its next input value, partially-compensated signal 302, will be copied out as downsampled signal 306.
6. Within feed-back equalizer 314 and feed-forward equalizer 300 of FIG. 12, each unit delay 350 of FIG. 14 is initialized to have a zero output.
7. Within feed-back equalizer 314 of FIG. 12, each unit delay 358 of FIG. 14 is initialized to zero.
8. Within feed-forward equalizer 300, each unit delay 358 of FIG. 14 is initialized to zero.
9. Accumulator 424 of FIG. 16 is initialized to output a value of zero as real-valued sample index 426.
10. Low-pass filter 394 is initialized with an all-zero internal state.
11. Upsampler 390 is initialized such that its next output, upsampled input signal 392, will be the value of digital input signal 246.

Decoder 156 then operates as described earlier until $N_c \cdot N_t$ values have been formed at estimated code stream 280 of FIG. 10. At this point, switch 292 is moved to gate estimated code stream 280 to desired output signal 286. From this point on, data stream 126 should correspond to data read from data stream 128 as shown in FIG. 3.

It must also be ensured that encoder 150 and decoder 156 enter and leave initialization mode such that the values on data stream 100 and data stream 126 of FIG. 3 are in exact correspondence. One example of a method to achieve this synchronization is to violate the DC restoration performed by DC eliminator 184. To signal the beginning of training, code stream 186 is set to the maximum legal code value for longer than the normal DC restoration period, for example for 16 samples. This is followed by setting code stream 186 to the minimum legal code value for the same number of samples. The training pattern then follows this synchronization pattern. Similarly, the end of training can be signaled by reversing the order of the above synchronization patten—repeating the minimum value followed by the maximum value. These synchronization patterns can then be detected by decoder 156 and used to control switch 292.

Other techniques for such synchronization are well known and are used in existing modems. See, for example, ITU-T, V.34, previously cited.

Alternate Delay Estimator

In previous discussion, delay estimator 342 was formed by examination of the filter tap weights within feed-forward equalizer 300. Other delay estimation means are also possible. For example, error signal 272 and compensated signal 274 of FIG. 10 can be used to form delay error estimate 270 as follows:

$$\Delta = \frac{e}{\frac{dv}{dt} + k}$$

where $\Delta$ is delay error estimate 270, v is compensated signal 274, e is error signal 272, and k is a parameter which can be easily obtained by those skilled in the art without undue experimentation. The value of k will depend upon the relative contributions of signal noise and clock jitter observed. Any other methods of implementing a delay estimation means to form delay error estimate 270 may also be used in the present invention.

Alternate Decoder Initialization Method

As described above, the parameters of decoder 156 may be established using fixed initialization values followed by a training period during which a known data sequence is transmitted. The previously described method uses the training sequence to perform sequential updates of the parameters of inverse filter 268 and clock estimator 264 on a sample-by-sample basis.

It is also possible to perform a single block update of all parameters. During the transmission of the training sequence, decoder 156 merely stores the values that appear as digital input signal 246. Once the entire training sequence has been transmitted, decoder 156 can perform an analysis of the acquired values and calculate values for its internal parameters.

The calculations needed to perform the parameter estimation are as follows:

1. Calculate the fundamental digital period, $T_u$, of the acquired signal using a rate estimation means. This can be done using any of a variety of well-known signal processing techniques, such as an autocorrelation analysis. It is known in advance that $T_u$ is approximately twice $N_c$, the length of the training sequence, assuming the use of the preferred sampling rate for analog-to-digital converter 240. The only source of difference will be due to differences between the sampling rate of telephone system clock 236 and half the sampling rate of analog-to-digital converter 240.

2. Initialize nominal period 380 of FIG. 15 as $$\frac{T_u}{2 \cdot N_c}.$$

3. Resample digital input signal 246 by passing it through clock synchronizer 260 with delay error estimate 270 set to zero, to form synchronized signal 266.

4. Form a matrix Y with $2 \cdot N_c$ columns and $N_t$ rows. The elements of Y are the values of synchronized signal 266 as computed above. These are stored in the matrix by filling the first row with sequential samples of synchronized signal 266, then the second row, and so on.

5. Compute the mean of each column of Y to form r, a $2 \cdot N_c$ element vector.

6. Compute an estimate of the energy, $\sigma^2$, of the noise component of the input signal using:

$$\sigma^2 = \frac{1}{N_c \cdot N_t} \sum_{j=1}^{N_c} \sum_{i=1}^{N_t} (Y_{ij} - r_i)^2$$

where $Y_{ij}$ is the element in column i, row j of Y.

7. Compute the $N_c$ element vector, c, by passing the training sequence values, such as those shown in Table 1, through a converter such as $\mu$-law-to-linear converter 278.

8. Form a matrix, A, with $N_f+N_b$ columns and $N_c$ rows as follows:

$$A = \begin{bmatrix} r_1 & r_2 & \cdots & r_{N_f} & c_{N_c-N_b+1} & c_{N_c-N_b+2} & \cdots & c_{N_c} \\ r_3 & r_4 & \cdots & r_{N_f+2} & c_{N_c-N_b+2} & c_{N_c-N_b+3} & \cdots & c_1 \\ r_5 & r_6 & \cdots & r_{N_f+4} & c_{N_c-N_b+3} & c_{N_c-N_b+4} & \cdots & c_2 \\ \cdots & \cdots & \cdots & \cdots & \cdots & \cdots & \cdots & \cdots \\ r_{2N_c-1} & r_{2N_c} & \cdots & r_{N_f+2N_c-2} & c_{N_c-N_b} & c_{N_c-N_b+1} & \cdots & c_{N_c-1} \end{bmatrix}$$

where $N_f$ is the number of filter taps in feed-forward equalizer 300 of FIG. 12 and $N_b$ is the number of filter taps in feed-back equalizer 314. For example, if $N_c=3$, $N_f=4$, and $N_b=2$, then:

$$A_{example} = \begin{bmatrix} r_1 & r_2 & r_3 & r_4 & c_2 & c_3 \\ r_3 & r_4 & r_5 & r_6 & c_3 & c_1 \\ r_5 & r_6 & r_1 & r_2 & c_1 & c_2 \end{bmatrix}$$

9. Find the value of a $N_f+N_b$ element vector, x, which minimizes $e^2$ in the following equation:

$$e^2 = \frac{(Ax-c)^T(Ax-c)}{N_c} + \sigma^2 \sum_{i=1}^{N_f} x_i^2 + e^2 \sum_{i=N_f+1}^{N_f+N_b} x_i^2$$

This can be solved using well-known techniques from linear algebra, calculus and iterative methods, which will be obvious to those skilled in the art.

10. Initialize previous value 360 of FIG. 14 for each tap of feed-forward equalizer 300 with $x_1 \ldots x_{N_f}$ respectively.

11. Initialize previous value 360 for each tap of feed-back equalizer 314 with $x_{N_f+1} \ldots x_{N_f+N_b}$ respectively.

12. Once these parameters have been computed, normal operation can commence. Note that the parameters will subsequently change due to adaptive updates based on error signal 272, as previously discussed.

The above sequence should be viewed as an example of another method of doing initialization of decoder 156 using a training sequence. Other methods and numerous variants are also possible. For example, the received training sequence may be truncated at each end to remove effects of the transient in switching between normal and training modes; the exact transition levels in linear-to-$\mu$-law converter 276 and $\mu$-law-to-linear converter 278 may be adjusted using the training information, modified equations for each previous value 360 may be used, etc.

Addition of a Reverse Channel Description

FIG. 17 shows an aspect of the present invention that combines the previously described communication system with a reverse channel. Data stream 100 is applied to encoder 150 as was described in reference to FIG. 3. This in turn connects to digital telephone network 134 via digital network connection 132. The data emerges verbatim from the network at the client's central office via digital network connection 138. The digital information is converted to analog form by line interface 140 and placed in analog form on local loop 122. At the client's premises, hybrid network 152 forms incoming analog signal 448 and an echo canceler 442 removes contributions to incoming analog signal 448 from an outgoing analog signal 444 to form analog signal 154. Analog signal 154 is then applied to decoder 156, which provides data stream 126. Data stream 128 from the client is converted to outgoing analog signal 444 by a modulator 446 in accordance with well-known techniques such as used in existing modems, and then applied to echo canceler 442 as well as fed onto local loop 122 via hybrid network 152. At the central office, this is converted to digital network connection 136 by line interface 140. Digital telephone network 134 transfers the data on digital network connection 136 to digital network connection 130. A demodulator 440 then converts this to data stream 102 for the server.

Operation

The system shown in FIG. 17 provides full duplex communication between two telephone subscribers: one with digital connectivity, and the other with analog connectivity. The operation of the forward channel is as described above in reference to FIG. 3, with one addition. Echo canceler 442, inserted between hybrid network 152 and decoder 156 has been added to reduce the effects of the reverse channel. Echo canceler 442 scales outgoing analog signal 444 and subtracts it from a incoming analog signal 448 to produce analog signal 154. The techniques and implementation of echo cancellers are well known. The reverse channel can be implemented using a variant of existing modem technology. See, for example, International Telecommunication Union, Telecommunication Standardization Sector (ITU-T), "A Duplex Modem Operating at Signaling Rates of up to 14,400 Bit/s for Use on the General Switched Telephone Network and on Leased Point to Point 2-wire Telephone-Type Circuits," Recommendation V.32 bis, Geneva, Switzerland (1991), incorporated herein by reference. Data are modulated by modulator 446 to form outgoing analog signal 444 that can be carried by the telephone system. The modulation techniques that may be employed are well known. For example, methods capable of transfers at up to 14,400 bits/second are described above. Similarly, methods capable of transfer rates up to 28,800 bits/second are described in International Telecommunication Union, Telecommunication Standardization Sector (ITU-T), Recommendation V.34, Geneva, Switzerland (1994), also incorporated herein by reference. Outgoing analog signal 444 is placed on local loop 122, using hybrid network 152, such as is employed in virtually all telephone equipment. Hybrid network 152 converts between a four-wire interface (two independent, unidirectional signals) on one side and a two-wire interface (one bidirectional signal) on the other side. The two-wire signal is simply the sum of the two signals on the four-wire side. At the client's central office, the telephone company's equipment converts the analog signal on local loop 122 to digital network connection 136, which is sampled at 8,000 samples/second using telephone system clock 236. In North America, this conversion is performed to provide eight bits per sample using a nonlinear mapping known as $\mu$-law to improve the signal-to-noise ratio of typical audio signals. Once converted to $\mu$-law, the client's signal is carried by digital telephone network 134 until it reaches the server's premises. Note that since the server has a digital connection to the phone system, the signal is not converted to analog form by the server's central office. There may, however, be several layers of interfaces (such as ISDN 'U' or 'S', etc.) intervening between the server and digital network connection 136. However, since the same data presented at digital network connection 136 also appears at digital network connection 130 later, this intervening hardware can be ignored. Demodulator 440 performs the inverse fiuction of modulator 446, as done by existing modems, with one small exception. Since both its input and output are digital, it can be implemented completely in digital hardware, whereas existing modems must work with an analog input. As with modulator 446, the implementation of demodulator 440 is well known and is described in the literature such as International Telecommunication Union, Telecommunication Standardization Sector (ITU-T), "A Duplex Modem Operating at Signaling Rates of up to 14,400 bit/s for Use on the General Switched Telephone Network and on Leased Point-To-Point 2-wire Telephone-type Circuits," Recommendation V.32 bis, Geneva, Switzerland (1991). Note that even the reverse channel can exhibit performance superior to traditional modems since degradation of the signal will occur only at the consumer's local loop. Existing modems must deal with distortions occurring on local loops at both ends of the communications path. Alternative implementations of this invention may use other well-known methods or techniques to provide a reverse channel or may eliminate it altogether. Thus, the description of one possible reverse channel implementation is provided merely for illustration and should not be construed as limiting the scope of this aspect of the invention. Note that the provision of a reverse channel also simplifies the synchronization of decoder 156 and encoder 150 and allows the system to be re-initialized if needed. The performance of the system may be monitored by decoder 156 by examination of error signal 272 of FIG. 10. If error signal 272 exceeds a given level preferably one-third of the average difference between $\mu$-law linear values, decoder 156 can notify encoder 150 via the reverse channel that the system should be re-initialed.

Combination with a Source Coder

It is possible to extend the function of encoder 150 and decoder 156 shown in FIG. 3 to perform additional invertible transformations on data stream 100 before application to encoder 150. The effects of these transformations can be removed by applying the inverse transformation to the output of decoder 156 before producing data stream 126. This transformation advantageously may provide any invertible function including, but not limited to:

Error Correction

Bits may be added to the data stream to provide error correction and/or detection using any of the well-known methods for such operations. These include, for example, convolutional coding, block codes or other error correction or detection schemes well documented in the literature. Note that if the same error processing applied to data stream 126 is also inserted in the signal path from linear-to-$\mu$-law converter 276 to $\mu$-law-to-linear converter 278, shown in FIG. 10, the quality of desired output signal 286, linear value 284, and error signal 272 will be improved and the performance of decoder 156 will benefit.

Subset of Source Alphabet:

Although there are 256 possible $\mu$-law codewords available for data transmission, the $\mu$-law mapping results in these words being unequally spaced in the linear domain. Thus, some pairs of codewords will be more easily confused by decoder 156 due to line noise or other impairments. The source coder can restrict its output to a subset of these codewords to improve the accuracy of decoder 156 at the expense of reduced gross data rate. This can also be used to adapt decoder 156 to poor line conditions by reducing the codeword alphabet if the decoder detects that it is unable to separate code words within a given error criterion. By reducing the codeword set, improved error margins will result at the cost of decreased data rate. Thus, the system can handle degraded connections by lowering the data rate.

Use With 56,000 bit/second Telephone Systems

In some PCM transmission schemes used by the telephone systems, the least significant bit of each eight-bit codeword is used for internal synchronization. This can be handled by transforming data stream 100 by inserting a zero bit once per eight bits such that the encoding process described in reference to FIG. 5 will place the inserted bit into the least-significant bit position of each encoded value applied to digital network connection 132. These inserted zeroes will then be removed at decoder 156 by post-processing data stream 126. In this way, the telephone system's use of the low order bit will not damage the transmitted data, but the maximum data rate will be reduced to 56,000 bits/second.

Data Compression

The source coder may provide lossless (or lossy) compression of the data stream 100 using any of the various known techniques well known to those skilled in the art. These include, but are not limited to, Lempel-Ziv compression, run-length coding, and Huffman encoding. The inversion of the chosen compression transformation, which is also well known, can be applied to data stream 126.

Use with Other Telephone Systems

The above methods can also be used with telephone systems that use nonlinear commanding operations other than $\mu$-law to transport the audio signal. For example, many parts of the world use a similar encoding, known as A-law. Aspects of the present inventions can be adapted to such systems by replacing all $\mu$-law-to-linear and linear-to-$\mu$-law converters with their A-law equivalents. These equivalents can also be implemented using a 256-element lookup table. In this case the table would be populated with the well-known A-law mapping. These modifications will be evident to those skilled in the art.

Combination with Existing Modems

An aspect of the present invention may also be used in conjunction with existing modems. In a traditional system, such as shown in FIG. 1, modem 104 may be modified to also incorporate the functionality of encoder 150 described above. Furthermore, modem 124 may be modified to also include the functionality of decoder 156. When a call is connected between the modified modem 104 and modem 124, both operate as for a normal connection between unmodified modems. After they have completed their initialization, modem 104 can send a negotiation request to modem 124 using well-known negotiation protocols such as those standardize by the International Telecommunications Union. If modem 124 includes an implementation of decoder 156, it can respond positively to the request. Otherwise the request will be rejected and normal modem communications will be used. Once a positive response has been received, modem 124 and modem 104 can switch to operating as shown in FIG. 17, beginning with an initialization sequence. In this way, a combined modem/decoder can interoperate with existing modems and, when possible, also advantageously provide increased throughput using an aspect of the present invention.

Combination with a Database Server

An aspect of the present invention may be used with a central server to provide data communications of any type (information, audio, video, etc.) between a central site and multiple users as shown in FIG. 18. A server 450 provides a server data 452 to a server interface 454 which consists of an array of encoders, such as encoder 150 described herein, and, possibly, an array of demodulators such as demodulator 440. Server interface 454 connects to digital telephone network 134 via a server connection 456 such as an ISDN PRI interface. Each subscriber to the service has a client interface 460 consisting of decoder 156 and, optionally, echo canceler 442 and modulator 446 similar to those shown in FIG. 17. Client interface 460 operates on a client connection 458 to provide a client data stream 462. Overall, this configuration allows multiple users to independently communicate with a central server or servers. This configuration is usable for any type of data service including, but not limited to: audio or music distribution, on line services, access to networking services, video or television distribution, voice, information distribution, credit-card validation, banking, interactive computer access, remote inventory management, point-of-sale terminals, multimedia. Other implementations or configurations of this invention are also applicable to these and other applications.

High-Speed Facsimile Transmission

An aspect of the present invention, shown in FIG. 19, may be used for high-speed transmission of facsimiles. A transmitting FAX 470 scans an image and translates it into a transmitted data stream 472 in a well-known manner. Transmitted data stream 472 is transmitted to a received data stream 476 via a distribution system 474 as shown, for example, in FIG. 17. A receiving fax 478 converts the data stream back into an image and prints or otherwise displays it. Distribution system 474 may be implemented as shown in FIG. 17 with data stream 100 replaced by transmitted data stream 472 and data stream 126 replaced by received data stream 476. Furthermore, data stream 128 and data stream 126 may be used for protocol negotiations between receiving fax 478 and transmitting FAX 470 as described in International Telecommunication Union, Telecommunication Standardization Sector (ITU-T), Recommendation V.17, "A 2-Wire Modem for Facsimile Applications With Rates up to 14,400 b/s," Geneva, Switzerland (1991) which is hereby incorporated herein by reference. In this way, facsimiles from transmitting FAX 470 can be advantageously transmitted to receiving fax 478 at rates higher than possible using conventional transmission schemes.

ISDN/Digital Telephony Relay

An aspect of the present invention can also be used in conjunction with any application that can make use of ISDN or digital telephony. This can provide a functional equivalent to ISDN for transmission from a digitally connected party to a second party who has only analog connectivity to the telephone network. This could be done either directly using a system such as shown in FIG. 17, or by use of a mediating relay as shown in FIG. 20. A digital subscriber 480 can make a digital call to an analog subscriber 490, who does not have direct digital access to the digital telephone network but has instead an analog subscriber connection 488. A filly digital connection is opened between digital subscriber 480 and a relay server 484 using a digital connection 482 such as ISDN, Switched-56, T1, or the like. Relay server 484 then communicates along a relay connection 486 with analog subscriber 490 using any means available such as a traditional modem or a system such as was shown in FIG. 17. With appropriate flow-control methods, which are well known to those skilled in the art, it will appear to the digital subscriber that a digital connection has been opened to the analog-only subscriber. Such a connection can be used for any digital communication, such as voice, data, digital FAX, video, audio, etc. Note that it is also possible to incorporate relay server 484 into the actual digital telephone network 134 to provide apparent digital connectivity to analog subscribers transparently.

SCOPE

While the invention has been described in connection with, what is presently considered to be, the most practical and preferred embodiments, it is to be understood that the invention is not limited to the disclosed embodiments, but on the contrary, it is intended to cover various modifications and equivalent arrangements included within the spirit and scope of the appended claims. For example, an equivalent training request can be accomplished by using the reverse channel in FIG. 17. The reverse channel of FIG. 17 also can provide other equivalent configurations for the control of information flow from decoder 156 to the encoder 150. However, in such a configuration, the present invention still provides the transfer of data between the data provider and consumer. In addition, compensation of a telephone line may be accomplished by other equivalent configurations, which are well known to those skilled in the art; equivalent training procedures may be used, different equalization methods may be utilized, and the system may be adapted to other central office equipment without departing from the scope of the invention. Therefore, persons of ordinary skill in this field are to understand that all such equivalent arrangements and modifications are to be included within the scope of the following claims.

I claim:

1. A method for use in communicating from a source to a subscriber, wherein the subscriber is connected to a digital network by an analog loop, and the source connected to the digital network for transmitting digital signal to the subscriber, the method comprising the steps of:

establishing a connection between a first modem located at the source and a second modem located at the subscriber;

initializing the first modem and the second modem;

sending a negotiation request from the first modem to the second modem; and responding positively to the negotiation request when the second modem includes a decoder that is operable to recover a sequence of codewords from an analog signal transmitted to the decoder over the analog loop, wherein each codeword in the sequence of codewords is associated with a codeword utilized by the digital network.

2. A method as claimed in claim 1, wherein the digital network codewords comprise pulse code modulated representations of quantization values applied at an interface between the digital network and the analog loop.

3. A method as claimed in claim 1, further comprising the step of switching the first modem and the second modem into a high speed mode of operation once the positive response to the negotiation request is received.

4. A method as claimed in claim 1, wherein the high speed mode of operation comprises the tranmission of information, encoded in the form of digital network codewords, from the fist modem to the second modem.

5. A multipurpose digital signal processor programmed with a set of instructions to perform the method of claim 1.

6. A high speed decoder for recovering a digital data stream from an analog signal transmitted to said decoder from a digital source connected to a digital telephone network interface via an analog loop connected to said decoder, comprising:

a clock recovery circuit including a clock estimator coupled to a clock synchroziner, said clock recovery circuit being coupled to receive an input signal from the analog loop;

an inverse filter coupled to receive a output from the clock recovery circuit; and a converter coupled to the inverse filter, the converter providing an estimated code steam in response to an output of the inverse filter, wherein said code stream comprises a sequence of codewords associated with a codeword set utilized by the digital telephone network.

* * * * *